(12) United States Patent
Chen et al.

(10) Patent No.: US 9,584,284 B2
(45) Date of Patent: Feb. 28, 2017

(54) SIMPLIFIED FDD-TDD CARRIER AGGREGATION

(71) Applicant: QUALCOMM Incorporated, San Diego, CA (US)

(72) Inventors: Wanshi Chen, San Diego, CA (US); Peter Gaal, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 14/495,619

(22) Filed: Sep. 24, 2014

(65) Prior Publication Data

US 2015/0085718 A1 Mar. 26, 2015

Related U.S. Application Data

(60) Provisional application No. 61/883,174, filed on Sep. 26, 2013.

(51) Int. Cl.
| | |
|---|---|
| *H04L 5/14* | (2006.01) |
| *H04L 5/00* | (2006.01) |
| *H04L 1/18* | (2006.01) |
| *H04B 7/26* | (2006.01) |

(52) U.S. Cl.
CPC .......... *H04L 5/0053* (2013.01); *H04B 7/2656* (2013.01); *H04L 1/1812* (2013.01); *H04L 5/14* (2013.01)

(58) Field of Classification Search
None
See application file for complete search history.

(56) References Cited

U.S. PATENT DOCUMENTS

| | | | |
|---|---|---|---|
| 2014/0022960 A1* | 1/2014 | Fu | H04W 24/02 370/280 |
| 2014/0029484 A1* | 1/2014 | Choi | H04W 72/1278 370/280 |

(Continued)

FOREIGN PATENT DOCUMENTS

WO    WO-2013007152 A1    1/2013

OTHER PUBLICATIONS

LG Electronics, "CA-based Aspects for FDD-TDD Joint Operation," 3GPP TSG RAN WG1 Meeting #74, R1-133372, Barcelona Spain, Aug. 19-23, 2013, 3 pgs., downloaded from http://www.3gpp.org/ftp/tsg_ran/wg1_rl1/TSGR1_74/Docs/, 3rd Generation Partnership Project.

(Continued)

*Primary Examiner* — Steven H Nguyen
(74) *Attorney, Agent, or Firm* — Holland & Hart LLP

(57) ABSTRACT

Methods, systems, and devices are described for multi-carrier communications involving one or more TDD component carriers and one or more FDD component carriers in a wireless communications network. Some described embodiments are directed to systems and methods for multi-carrier communications for a half-duplex device. The described methods, systems, and devices may simplify multi-carrier communications, such as the determination of hybrid automatic repeat request (HARQ) and/or scheduling timing with FDD+TDD carrier aggregation.

29 Claims, 17 Drawing Sheets

(56) References Cited

U.S. PATENT DOCUMENTS

2015/0023228 A1* 1/2015 Yin .................. H04L 5/001
 370/280
2015/0085711 A1* 3/2015 Wang ................. H04L 5/14
 370/280

OTHER PUBLICATIONS

Hitachi LTD., "Scenarios and Impacts for CA-based TDD-FDD Joint Operation," 3GPP TSG RAN WG1 Meeting #74, R1-133556, Barcelona Spain, Aug. 19-23, 2013, 3 pgs., downloaded from http://www.3gpp.org/ftp/tsg_ran/wg1_rl1/TSGR1_74/Docs/, 3rd Generation Partnership Project.
ISA/EPO, International Search Report and Written Opinion of the International Searching Authority, Int'l App. No. PCT/US2014/057416, Dec. 5, 2014, European Patent Office, Rijswijk, NL, 12 pgs.

\* cited by examiner

| Subframe | 0 | 1 | 2 | 3 | 4 | 5 | 6 | 7 | 8 | 9 |
|---|---|---|---|---|---|---|---|---|---|---|
| TDD, PCC | D | S | U | D | D | D | S | U | U | D |
| FDD DL, SCC | D | D/S | U | D | D | D | D/S | D | D | D |
| FDD UL, SCC | D | D/S | U | U | D | D | D/S | U | U | U |

FIG. 4

SIMPLIFIED FDD-TDD CARRIER AGGREGATION

CROSS REFERENCES

The present application for patent claims priority to U.S. Provisional Patent Application No. 61/883,174 by Chen et al., entitled "Simplified FDD-TDD Carrier Aggregation," filed Sep. 26, 2013, assigned to the assignee hereof, and expressly incorporated by reference herein.

BACKGROUND

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of base stations that can support communication for a number of mobile devices. In some technologies, mobile devices may be called access terminals, user equipments (UEs), mobile stations, and the like. A mobile device may communicate with a base station via downlink (DL) and uplink (UL) transmissions. The downlink (or forward link) refers to the communication link from the base station to the mobile device, and the uplink (or reverse link) refers to the communication link from the mobile device to the base station.

Multiple access technologies may use Frequency Division Duplexing (FDD) or Time Division Duplexing (TDD) to provide uplink and downlink communications over one or more carriers. TDD operation offers flexible deployments without requiring paired spectrum resources. TDD formats include transmission of frames of data, each including a number of different subframes in which different subframes may be uplink or downlink subframes. In systems that operate using TDD, different formats may be used in which uplink and downlink communications may be asymmetric. Flexible TDD DL/UL configuration provides efficient ways to use unpaired spectrum resources and TDD configuration may be adaptive based on traffic conditions (e.g., UL/DL loading at the base station and/or UE).

The wireless communication networks including the base stations and UEs may support operation on multiple carriers which may be called carrier aggregation. Carrier aggregation may be used to increase throughput between a base station supporting multiple component carriers and a UE, and UEs may be configured to communicate using multiple component carriers associated with multiple base stations. In some instances, carrier aggregation involving both FDD and TDD frame structures may be supported.

SUMMARY

Methods, systems, and devices are described which simplify multi-carrier communications for a device in a wireless communications network employing one or more TDD component carriers and one or more FDD component carriers.

A method of multi-carrier communication for a device in a wireless communications network is described. In some embodiments, at least one time division duplex (TDD) component carrier and at least one frequency division duplex (FDD) component carrier may be involved. In one configuration, the method may involve determining a first reference subframe configuration for a downlink of the at least one FDD component carrier, and determining a second reference subframe configuration for an uplink of the at least one FDD component carrier. Further, the method may involve communicating on the at least one FDD component carrier according to the determined first and second reference subframe configurations in respective downlink and uplink directions. The communicating on the at least one FDD component carrier may include determining at least one of a hybrid automatic repeat-request (HARQ) timing or a scheduling timing based on the first reference subframe configuration or the second reference subframe configuration.

In some embodiments, the method may involve determining the at least one TDD component carrier as a primary component carrier and the at least one FDD component carrier as a secondary component carrier.

In some embodiments, the method may involve determining the second reference subframe configuration to be the same as the first reference subframe configuration. In other embodiments, the method may involve determining the second reference subframe configuration to be different from the determined first reference subframe configuration.

In some embodiments, the method may involve determining an uplink-downlink subframe configuration of the at least one TDD component carrier, and determining the first reference subframe configuration to be the same as the configuration determined for the at least one TDD component carrier.

In some embodiments, at least one of the first and second reference subframe configurations is determined based on whether self-carrier scheduling or cross-carrier scheduling is used to schedule communications on the at least one FDD component carrier.

In some embodiments, the least one frequency division duplex (FDD) component carrier may be at least two FDD component carriers. In such embodiments, determining the first reference subframe configuration for the downlink of the at least one FDD component carrier may involve determining the first reference subframe configuration for the downlink of the at least two FDD component carriers. Further, determining the second reference subframe configuration for the uplink of the at least one FDD component carrier may involve determining the second reference subframe configuration for the uplink of the at least two FDD component carriers.

In some embodiments, determining at least one of determining of the first reference subframe configuration and determining of the second reference subframe configuration is based at least in part on a subframe configuration determined for the at least one TDD component carrier.

In some embodiments, at least one of determining the first reference subframe configuration and determining the second reference subframe configuration may be based at least in part on a duplex capability of the device. The device may include a half-duplex device for multi-carrier communications.

In some embodiments, the method may involve identifying at least one special subframe in the first reference subframe configuration. In such embodiments, the method may further involve treating the at least one identified special subframe as a regular downlink subframe. Alternatively or additionally, the method may further involve treating the at least one identified special subframe as a special subframe. Alternatively or additionally, the method may further involve omitting the at least one identified special subframe for downlink receptions by the device.

In some embodiments, the method may involve identifying at least one special subframe in the second reference subframe configuration. In such embodiments, the method may further involve treating the at least one identified special subframe as a regular uplink subframe. Alternatively or additionally, the method may further involve treating the at least one identified special subframe as a special subframe. Alternatively or additionally, the method may further involve omitting the at least one identified special subframe for uplink transmissions by the device.

In some embodiments, the method may involve identifying at least one downlink subframe in the at least one FDD component carrier that is not part of the first reference subframe configuration. In such embodiments, the method may further involve using the at least one identified downlink subframe for scheduling via one of self-carrier scheduling from the FDD component carrier or cross-carrier scheduling from a TDD component carrier. Further, in such embodiments, the method may involve providing acknowledgement/negative acknowledgement (ACK/NAK) feedback for the at least one identified downlink subframe.

In some embodiments, the ACK/NACK feedback is provided in a same uplink subframe with the ACK/NACK feedback for at least one downlink subframe part of the first reference subframe configuration.

In some embodiments, determining the first reference subframe configuration is based at least part on one or more received signals.

In some embodiments, determining the reference subframe configuration may be based at least in part on a layer 3 configuration. Alternatively or additionally, determining the reference subframe configuration may be based at least in part on a subframe configuration of the at least one TDD component carrier.

In some embodiments, the at least one frequency division duplex (FDD) component carrier may be a plurality of FDD component carriers. In such embodiments, determining the reference subframe configuration may involve determining a same reference TDD uplink-downlink subframe configuration for each of the plurality of FDD component carriers.

In some embodiments, determining the reference subframe configuration may involve determining a subframe configuration of the at least one TDD component carrier. In such embodiments, determining the reference subframe configuration may be based on the configuration determined for the at least one TDD component carrier.

In some embodiments, determining the reference subframe configuration may be based at least part on one or more received signals.

An apparatus for multi-carrier communication for a device in a wireless communications network is also described. In some embodiments, at least one time division duplex (TDD) component carrier and at least one frequency division duplex (FDD) component carrier may be involved. In one configuration, the apparatus includes means for determining a first reference subframe configuration for a downlink of the at least one FDD component carrier, and means for determining a second reference subframe configuration for an uplink of the at least one FDD component carrier. In such embodiments, the apparatus may further include means for communicating on the at least one FDD component carrier according to the determined first and second reference subframe configurations in respective downlink and uplink directions. The communicating on the at least one FDD component carrier may include determining at least one of a hybrid automatic repeat-request (HARQ) timing or a scheduling timing based on the first reference subframe configuration or the second reference subframe configuration.

An apparatus for multi-carrier communication for a device in a wireless communications network is also described. In some embodiments, at least one time division duplex (TDD) component carrier and at least one frequency division duplex (FDD) component carrier may be involved. The apparatus may include a processor and memory coupled to the processor. The processor may be configured to determine a first reference subframe configuration for a downlink of the at least one FDD component carrier, determine a second reference subframe configuration for an uplink of the at least one FDD component carrier, and communicate on the at least one FDD component carrier according to the determined first and second reference subframe configurations in respective downlink and uplink directions. The communicating on the at least one FDD component carrier may include determining at least one of a hybrid automatic repeat-request (HARQ) timing or a scheduling timing based on the first reference subframe configuration or the second reference subframe configuration.

A non-transitory computer-readable medium for storing instructions executable by a processor is described. In some embodiments, at least one time division duplex (TDD) component carrier and at least one frequency division duplex (FDD) component carrier may be involved. In one configuration, the non-transitory computer-readable medium may include instructions to determine a first reference subframe configuration for a downlink of the at least one FDD component carrier; instructions to determine a second reference subframe configuration for an uplink of the at least one FDD component carrier; and instructions to communicate on the at least one FDD component carrier according to the determined first and second reference TDD uplink-downlink subframe configurations in respective downlink and uplink directions. The communicating on the at least one FDD component carrier may include determining at least one of a hybrid automatic repeat-request (HARQ) timing or a scheduling timing based on the first reference subframe configuration or the second reference subframe configuration.

The foregoing has outlined rather broadly the features and technical advantages of examples according to the disclosure in order that the detailed description that follows may be better understood. Further scope of the applicability of the described methods and apparatuses will become apparent from the following detailed description, claims, and drawings. The detailed description and specific examples are given solely by way of illustration, as various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If solely the first reference label is used in the specification, the description is applicable to any one of the similar components having the same first reference label irrespective of the second reference label.

FIG. 4 shows an example of a set of subframe configurations;

DETAILED DESCRIPTION

Figure 1:
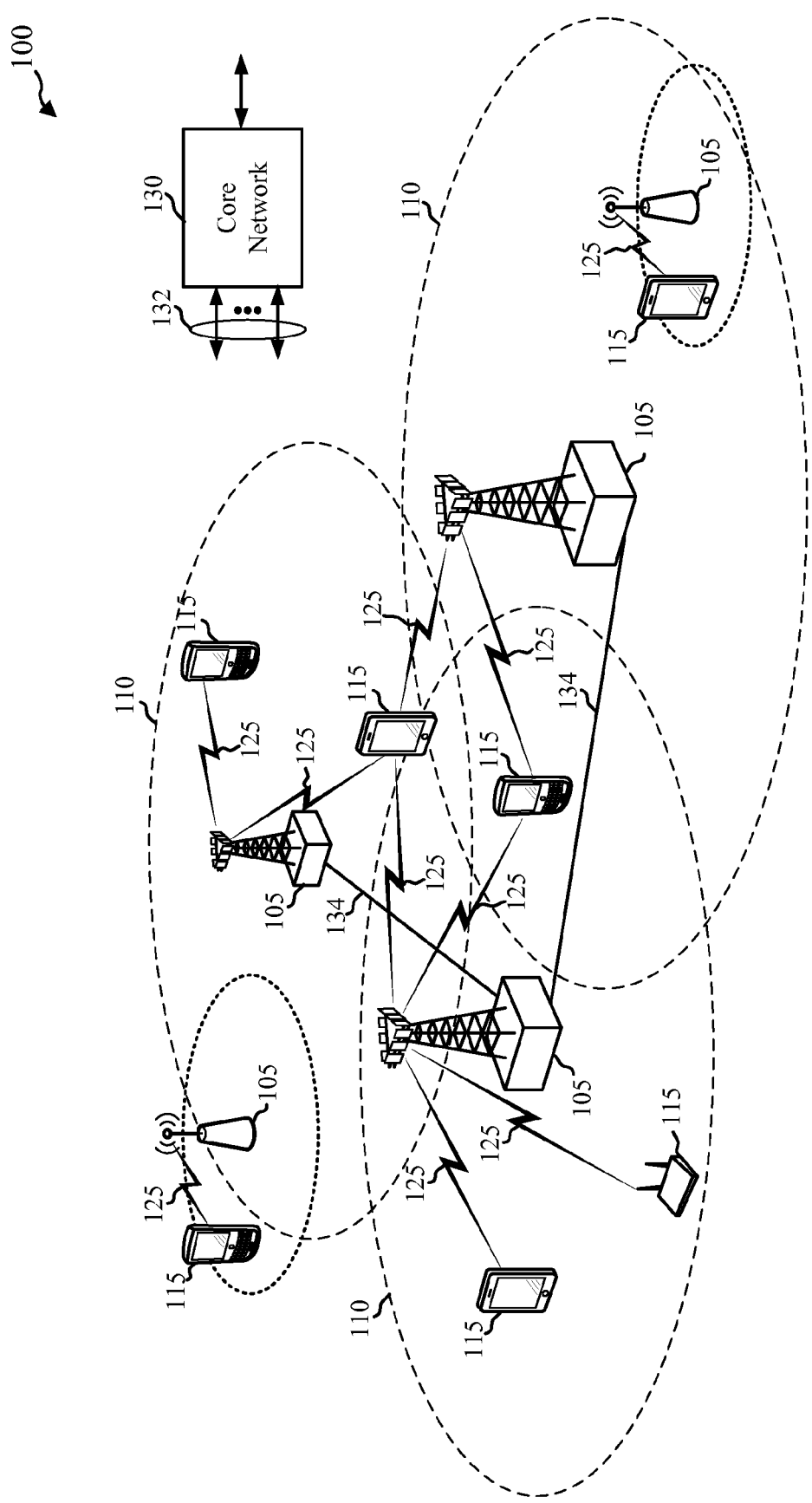
FIG. 1 shows a diagram illustrating an example of a wireless communications system.

Described embodiments are directed to systems and methods for multi-carrier communications for a device in a wireless communications network employing one or more TDD component carriers and one or more FDD component carriers.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The wireless communications system 100 includes base stations (or cells) 105, user equipments (UEs) 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each wireless communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up a portion of the coverage area (not shown). The wireless communications system 100 may include base stations 105 of different types (e.g., macro, micro, and/or pico base stations). There may be overlapping coverage areas for different technologies.

The UEs 115 are dispersed throughout the wireless communications system 100, and each device may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro base stations, pico base stations, femto base stations, relay base stations, and the like.

The wireless communication links 125 shown in the wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions.

In embodiments, the wireless communications system 100 is an LTE/LTE-A network. In LTE/LTE-A networks, the terms evolved Node B (eNB) and user equipment (UE) may be generally used to describe the base stations 105 and UEs 115, respectively. The wireless communications system 100 may be a Heterogeneous LTE/LTE-A network in which different types of eNBs provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The wireless communications system 100 according to an LTE/LTE-A network architecture may be referred to as an Evolved Packet System (EPS). The wireless communications system 100 may include one or more UEs 115, an Evolved UMTS Terrestrial Radio Access Network (E-UTRAN), an Evolved Packet Core (EPC) (e.g., core network 130), a Home Subscriber Server (HSS), and an Operator's IP Services. The wireless communications system may interconnect with other access networks using other Radio Access Technologies. For example, the wireless communications system 100 may interconnect with a UTRAN-based network and/or a CDMA-based network via one or more Serving GPRS Support Nodes (SGSNs). To support mobility of UEs 115 and/or load balancing, the wireless communications system 100 may support handover of UEs 115 between a source base station 105 and a target base station 105. The wireless communications system 100 may support intra-RAT handover between base stations 105 of the same RAT (e.g., other E-UTRAN networks), and inter-RAT handovers between base stations 105 of different RATs (e.g., E-UTRAN to CDMA, etc.). The wireless communications system 100 may provide packet-switched services, however, as those skilled in the art will readily appreciate, the various concepts presented throughout this disclosure may be extended to networks providing circuit-switched services.

The E-UTRAN may include the base stations 105 and may provide user plane and control plane protocol terminations toward the UEs 115. The base stations 105 may be connected to other base stations 105 via backhaul link 134 (e.g., an X2 interface, and the like). The base stations 105 may provide an access point to the core network 130 for the UEs 115. The base stations 105 may be connected by backhaul link 132 (e.g., an S1 interface, and the like) to the core network 130. Logical nodes within the core network 130 may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service (PSS).

The UEs 115 may be configured to collaboratively communicate with multiple base stations 105 through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of base stations to improve overall transmission quality for UEs as well as increasing network and spectrum utilization. Generally, CoMP techniques utilize backhaul links 132 and/or 134 for communication between base stations 105 to coordinate control plane and user plane communications for the UEs 115.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) techniques to provide retransmission at the MAC layer to ensure reliable data transmission. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

The downlink physical channels may include at least one of a physical downlink control channel (PDCCH), a physical HARQ indicator channel (PHICH), and a physical downlink shared channel (PDSCH). The uplink physical channels may include at least one of a physical uplink control channel (PUCCH) and a physical uplink shared channel (PUSCH). The PDCCH may carry downlink control information (DCI), which may indicate data transmissions for UEs on the PDSCH as well as provide UL resource grants to UEs for the PUSCH. The UE may transmit control information in the PUCCH on the assigned resource blocks in the control section. The UE may transmit data or both data and control information in the PUSCH on the assigned resource blocks in the data section.

LTE/LTE-A utilizes orthogonal frequency division multiple-access (OFDMA) on the downlink and single-carrier frequency division multiple-access (SC-FDMA) on the uplink. An OFDMA and/or SC-FDMA carrier may be partitioned into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard-band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

The carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. Time intervals may be expressed in multiples of a basic time unit $T_s=1/30720000$. Each frame structure may have a radio frame length $T_f=307200 \cdot T_s=10$ ms and may include two half-frames or slots of length $153600 \cdot T_s=5$ ms each. Each half-frame may include five subframes of length $30720 \cdot T_s=1$ ms.

LTE/LTE-A networks support multi-process Type II HARQ with a configurable number of independent HARQ processes. Each HARQ process waits to receive an acknowledgement (ACK) before transmitting a new data or transport block. LTE/LTE-A uses asynchronous HARQ transmission on the downlink and synchronous HARQ transmission on the uplink. In both asynchronous and synchronous HARQ, ACK/NAK information may be provided a certain number of subframes after a DL or UL transmission. Generally, for LTE/LTE-A FDD carriers, ACK/NAK information for a HARQ process is transmitted 4 subframes after a data transmission. In asynchronous HARQ, a scheduled ACK/NACK for subsequent transmissions is not predetermined and the base station provides instructions to the UE regarding which HARQ process are transmitted in each subframe. For synchronous HARQ in FDD, UEs perform a second transmission of a particular HARQ process a predetermined number of subframes after receiving a NAK. Generally, for LTE/LTE-A FDD carriers subsequent UL transmissions of the same HARQ process occur 4 subframes after receiving a NAK. For synchronous HARQ in TDD, ACK/NAK information may be received in a subframe i associated with UL transmissions in a subframe i−k, where k may be defined according to TDD UL/DL configuration. Subsequent transmissions of particular HARQ processes may be performed in a subframe n for a NAK received in a subframe n−k, where k may be defined according to TDD UL/DL configuration.

Figure 2:
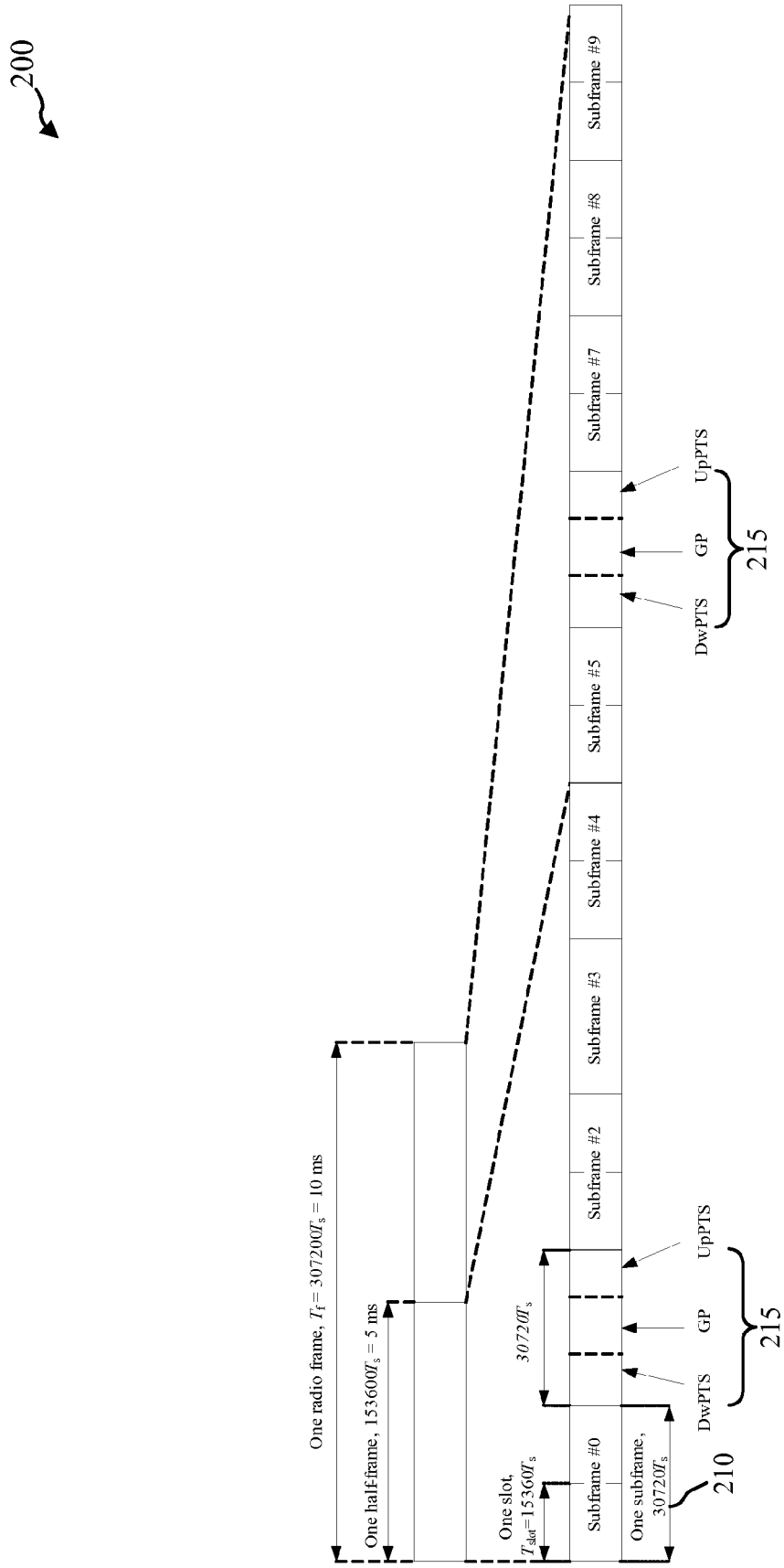
FIG. 2 shows a frame structure for a TDD carrier.

FIG. 2 illustrates a frame structure 200 for a TDD carrier. For TDD frame structures, each subframe 210 may carry UL or DL traffic, and special subframes ("S") 215 may be used to switch between DL to UL transmission. Allocation of UL and DL subframes within radio frames may be symmetric or asymmetric and may be reconfigured semi-statically or dynamically. Special subframes 215 may carry some DL and/or UL traffic and may include a Guard Period (GP) between DL and UL traffic. Switching from UL to DL traffic may be achieved by setting timing advance at the UEs without the use of special subframes or a guard period between UL and DL subframes. TDD configurations with switch-point periodicity equal to the frame period (e.g., 10 ms) or half of the frame period (e.g., 5 ms) may be supported. For example, TDD frames may include one or more special frames, and the period between special frames may determine the TDD DL-to-UL switch-point periodicity for the frame.

For LTE/LTE-A, seven different TDD UL/DL configurations are defined that provide between 40% and 90% DL subframes as illustrated in Table 1.

TABLE 1

TDD Configurations

| TDD Configuration | Period (ms) | Subframe | | | | | | | | | |
|---|---|---|---|---|---|---|---|---|---|---|---|
| | | 0 | 1 | 2 | 3 | 4 | 5 | 6 | 7 | 8 | 9 |
| 0 | 5 | D | S | U | U | U | D | S | U | U | U |
| 1 | 5 | D | S | U | U | D | D | S | U | U | D |
| 2 | 5 | D | S | U | D | D | D | S | U | D | D |
| 3 | 10 | D | S | U | U | U | D | D | D | D | D |
| 4 | 10 | D | S | U | U | D | D | D | D | D | D |
| 5 | 10 | D | S | U | D | D | D | D | D | D | D |
| 6 | 5 | D | S | U | U | U | D | S | U | U | D |

Because some TDD UL/DL configurations have fewer UL subframes than DL subframes, several techniques may be used to transmit ACK/NAK information for an association set within a PUCCH transmission in the uplink subframe. For example, bundling may be used to combine ACK/NAK information to reduce the amount of ACK/NAK information to be sent. ACK/NAK bundling may combine the ACK/NAK information into a single bit that is set to an acknowledgement (ACK) value if the ACK/NAK information for each subframe of the association set is an ACK. For example, ACK/NAK information may be a binary '1' to represent ACK and a binary '0' to represent a negative acknowledgement (NACK) for a particular subframe. ACK/NAK information may be bundled using a logical AND operation on the ACK/NAK bits of the association set. Bundling reduces the amount of information to be sent over the PUCCH and therefore increases the efficiency of HARQ ACK/NAK feedback. Multiplexing may be used to transmit multiple bits of ACK/NAK information in one uplink subframe. For example, up to four bits of ACK/NAK may be transmitted using PUCCH format 1b with channel selection.

Wireless communications system 100 may support operation on multiple carriers, which may be referred to as carrier aggregation (CA) or multi-carrier operation. A carrier may also be referred to as a component carrier (CC), a layer, a channel, etc. The terms "carrier," "layer," "CC," and "channel" may be used interchangeably herein. A carrier used for the downlink may be referred to as a downlink CC, and a carrier used for the uplink may be referred to as an uplink CC. A UE 115 may be configured with multiple downlink CCs and one or more uplink CCs for carrier aggregation. Multi-layer base stations 105 may be configured to support communications with UEs over multiple CCs on the downlink and/or uplink. Thus, a UE 115 may receive data and control information on one or more downlink CCs from one multi-layer base station 105 or from multiple base stations 105 (e.g., single or multi-layer base stations). The UE 115 may transmit data and control information on one or more uplink CCs to one or more base stations 105. Carrier aggregation may be used with both FDD and TDD component carriers. For DL carrier aggregation, multiple bits of ACK/NAK are fed back when multiple DL transmissions occur in one subframe. Up to 22 bits of ACK/NAK may be transmitted using PUCCH format 3 for DL carrier aggregation.

Figure 3:
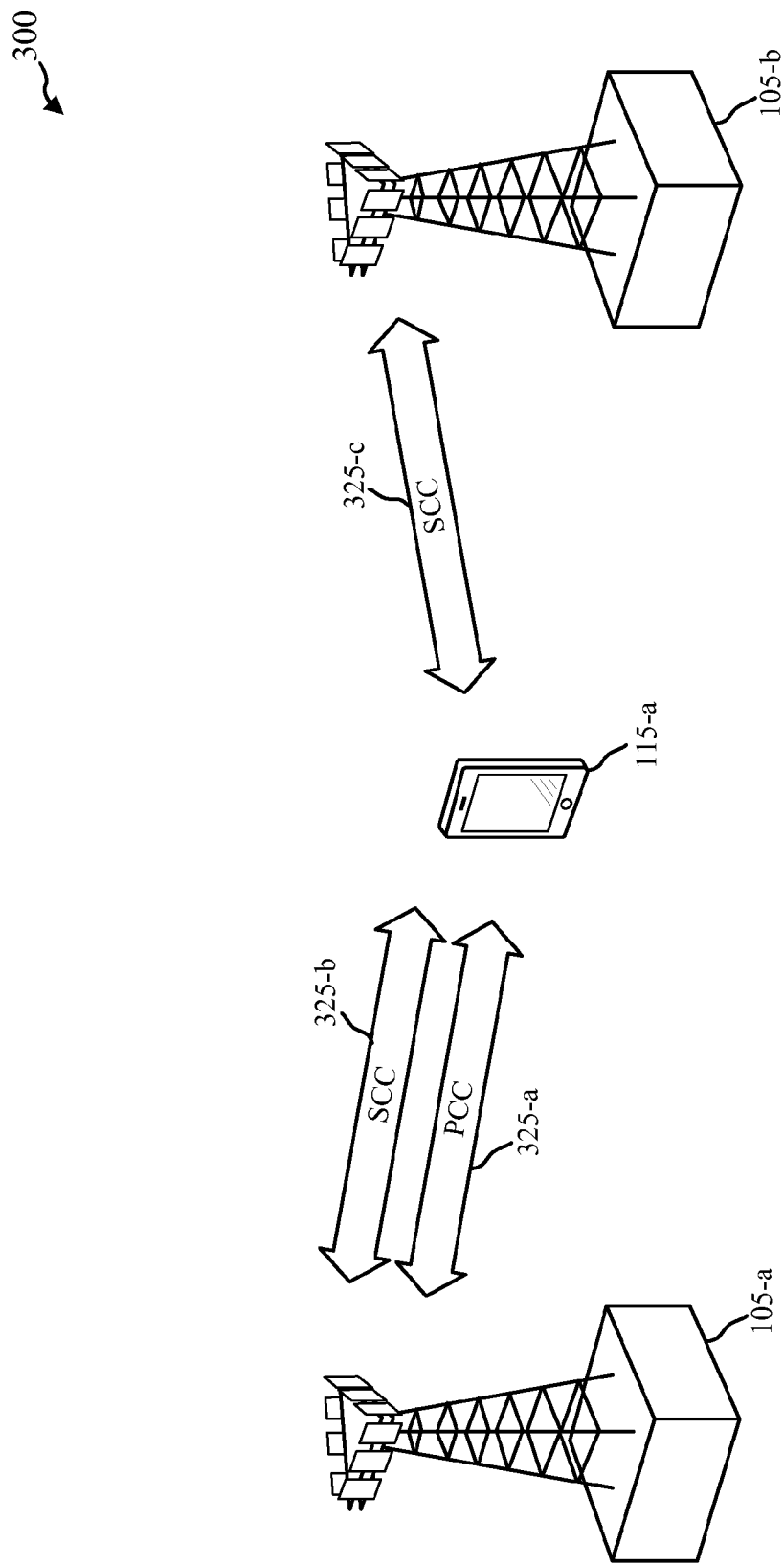
FIG. 3 shows a wireless communications system employing carrier aggregation.

FIG. 3 shows a wireless communications system 300 employing carrier aggregation in accordance with various embodiments. The wireless communications system 300 may illustrate aspects of the wireless communications system 100. The wireless communications system 300 can include one or more base stations 105 using one or more component carriers 325 ($CC_1$-$CC_N$) to communicate with UEs 115. The base stations 105 can transmit information to the UEs 115 over forward (downlink) channels on component carriers 325. In addition, the UEs 115 can transmit information to the base station 105-a over reverse (uplink) channels on component carriers 325. In describing the various entities of FIG. 3, as well as other figures associated with some of the disclosed embodiments, for the purposes of explanation, the nomenclature associated with a 3GPP LTE or LTE-A wireless network is used. However, it is to be appreciated that the wireless communications system 300 can operate in other networks such as, but not limited to, an OFDMA wireless network, a CDMA network, a 3GPP2 CDMA2000 network and the like. One or more of the component carriers $CC_1$-$CC_N$ 325 can be in the same frequency operating band (intra-band) or in different operating bands (inter-band) and intra-band CCs can be contiguous or non-contiguous within the operating band.

In the wireless communications system 300, UEs 115 may be configured with multiple CCs associated with one or more base station 105. One CC is designated as the primary CC (PCC) for a UE 115. PCCs may be semi-statically configured by higher layers (e.g., RRC, etc.) on a per-UE basis. Certain uplink control information (UCI) (e.g., ACK/NAK, channel quality information (CQI), scheduling requests (SR), etc.), when transmitted on PUCCH, are carried by the PCC. Thus, UL SCCs may not be used for PUCCH for a given UE. The UEs 115 may be configured with asymmetric DL to UL CC assignments. In LTE/LTE-A, up to 5:1 DL to UL mapping is supported. Thus, one UL CC (e.g., PCC UL) may carry UCI (e.g., ACK/NAK) on PUCCH for up to 5 DL CCs.

In the example illustrated in FIG. 3, UE 115-a is configured with PCC 325-a and SCC 325-b associated with base station 105-a and SCC 325-c associated with base station 105-b. The wireless communications system 300 may be configured to support carrier aggregation using various combinations of FDD and/or TDD CCs 325. For example, some configurations of wireless communications system 300 may support CA for FDD CCs (e.g., an FDD PCC and one or more FDD SCCs). Other configurations may support CA using TDD CCs (e.g., a TDD PCC and one or more TDD SCCs). In some examples, the TDD SCCs for CA have the same DL/UL configuration while other examples support TDD CA with CCs of different DL/UL configurations.

In some embodiments, the wireless communications system 300 may support TDD-FDD joint operation, including CA and other types of joint operation (e.g., dual-connectivity when base stations 105 of the multiple CCs configured for a UE 115 have reduced backhaul capabilities, etc.). TDD-FDD joint operation may allow UEs 115 supporting FDD and TDD CA operation to access both FDD and TDD CCs using CA or in single CC mode. In addition, legacy UEs with various capabilities (e.g., single mode UEs, FDD CA capable UEs, TDD CA capable UEs, etc.), may connect to FDD or TDD carriers of wireless communications system 300.

In general, it may be helpful to simplify carrier aggregation while still obtaining the benefits thereof. In particular, supporting FDD+TDD carrier aggregation when a TDD component carrier (CC) is the primary component carrier (PCC) presents significant challenges. These challenges may be due to the fact that the set of DL subframes (or UL subframes) for an FDD carrier is a superset of that of a TDD carrier when the TDD CC is designated as the PCC to carry PUCCH. This fact may complicate, for example, HARQ timing design, scheduling timing, and channel-state information (CSI) feedback, etc. Thus, it may be helpful to provide a simplified approach to FDD+TDD carrier aggregation, particularly when a TDD CC is the PCC.

Additional issues may arise with FDD+TDD carrier aggregation if the UEs do not have full-duplex capabilities. For example, when an FDD component carrier (CC) is designated as the primary component carrier (PCC), UEs with full-duplex capabilities may be needed. As such, an approach that allows half-duplex UEs to implement FDD+TDD carrier aggregation with an FDD CC as the PCC may be able to increase deployment of FDD+TDD carrier aggregation.

In various approaches described herein, FDD+TDD carrier aggregation may be implemented to operate according to the TDD UL/DL configurations defined for TDD operation in Table 1. It should be understood, however, that the described techniques are applicable to additional TDD UL/DL configurations, should such be defined for TDD operation.

In embodiments, when FDD+TDD carrier aggregation is to be supported, an FDD CC for downlink (FDD DL) and/or an FDD CC for uplink (FDD UL) may be treated similarly as a TDD CC in a particular TDD UL/DL configuration. In other words, a reference subframe configuration may be determined for an FDD CC. The reference subframe configuration may correspond to an available TDD UL:DL subframe configuration and it may be the same or different for uplink and downlink communications on the FDD carrier. Communicating over the wireless communications network may then be performed on the FDD CC according to the determined reference subframe configuration.

In some embodiments, a reference subframe configuration may be determined for the DL carrier of an FDD CC. Also, a reference subframe configuration may be determined for the UL carrier of the FDD CC. In such cases, communicating over the wireless communications network may be performed on the FDD CC according to the determined reference subframe configurations in respective downlink and uplink directions. In one example, a hybrid automatic repeat-request (HARQ) timing may be determined based on the reference subframe configuration. HARQ timing may refer to, for example, a timing between a physical downlink shared channel (PDSCH) transmission or a physical uplink shared channel (PUSCH) transmission and a corresponding ACK/NAK message. In another example, a scheduling timing may be determined based on the reference subframe configuration. Scheduling timing may refer to, for example, a timing between a physical downlink control channel (PDCCH) or enhanced/evolved PDCCH (EPDCCH) and a PDSCH or PUSCH.

Various approaches are contemplated for handling special subframes in an FDD DL that is treated similarly as a TDD UL/DL subframe configuration. Also, various approaches are contemplated for handling special subframes in an FDD UL that is treated similarly as a TDD UL/DL subframe configuration. Various approaches are also contemplated for utilizing subframes that are not available for DL in the FDD DL and/or are not available for UL in the FDD UL according to the reference subframe configuration. For example, such subframes may be utilized for scheduling.

FIG. 4 illustrates an example of a set of subframe configurations for one implementation of the approaches described herein. For this example, one FDD CC and one TDD CC are involved for the sake of clarity. As shown, a TDD CC is determined to be or is designated as the PCC, with the FDD CC being the SCC. The TDD PCC may be configured in TDD UL/DL Configuration 1 (see Table 1, above).

In some embodiments, TDD UL/DL Configuration 5 is determined for the reference subframe configuration for the FDD DL. In this case, ninety percent of the subframes in a radio frame are available for DL communication—subframe 2 in the FDD DL reference subframe configuration may not be used for PDSCH for the UE. However, subframe 2 possibly may be used for other UEs, and/or may be used by multimedia broadcast/multicast service (MBMS) for the UE or other UEs.

In some embodiments, TDD UL/DL Configuration 0 is determined for the reference subframe configuration for the FDD UL. In this case, sixty percent of the subframes in a radio frame are available for UL communication—subframes 0 and 5 in this FDD UL reference subframe configuration may not be used for UL transmissions, and subframes 1 and 6 at least partially may not be used for UL transmissions.

The determination of the reference subframe configuration for the FDD DL and/or UL may be made by the UE or by a base station of the wireless communications network, as appropriate or desired, for example, based on suitable parameters. For example, the reference subframe configuration for the FDD DL and/or UL may be chosen to be compatible with the configuration of the TDD PCC. Compatibility may be in terms of a same HARQ round-trip-time (RTT), a same configuration, etc. As another example, the reference subframe configuration for the FDD DL and/or UL may be chosen to take into account a maximum of ACK/NAK bits on the TDD PCC. As another example, the reference subframe configuration for the FDD DL and/or UL may be chosen based on the UE's capability, e.g., whether the UE is full-duplex or half-duplex, its UE category, a maximum number of DL CCs and/or UL CCs that the UE can aggregate, etc.

In some embodiments, the reference subframe configuration may be set (e.g., hard-coded) for the UE, and thus determined by accessing storage or memory of the UE, for example. In other embodiments, the reference subframe configuration may be signaled, either specifically to the UE or to UEs in a particular cell, such as by a base station serving the cell, or to the serving base station from the UE.

In some embodiments, the reference subframe configuration for the FDD DL and the FDD UL may be the same. In other embodiments, different reference subframe configurations may be determined for the FDD DL and the FDD UL, respectively. As noted above, the possible reference subframe configurations may be restricted to the existing seven configurations shown in Table 1. However, extension of the TDD UL/DL configurations for TDD beyond the current configurations is also possible.

In the example shown in FIG. 4, the reference subframe configuration for the FDD DL has special subframes for subframe 1 and subframe 6. Several approaches are contemplated for handling special subframes in the FDD DL.

One approach is to treat such special subframes as regular DL subframes. When such an approach is used for the example shown, the DL transmissions may span the entire subframe for a full-duplex UE. On the other hand, for a half-duplex UE, the special subframes may be omitted for DL transmissions if the corresponding PCC subframe is a special subframe. For the example shown, subframes 1 and 6 would be omitted for DL transmissions because subframes 1 and 6 in the subframe configuration of the PCC are special subframes.

Another approach is to treat special subframes in the FDD DL based on the corresponding subframe configuration of the PCC. When such an approach is used, though not shown in the example of FIG. 4, the special subframe(s) in the reference subframe configuration for the FDD DL may be treated as a regular DL subframe(s) if the corresponding subframe(s) in the TDD UL/DL configuration of the PCC are DL subframe(s). As shown in the example, special subframes 1 and 6 in the reference subframe configuration for the FDD DL may be treated as special subframes because corresponding subframes 1 and 6 in the TDD UL/DL configuration of the PCC are special subframes. Such special subframes in the FDD DL may be set, as appropriate or desired, to be some special subframe configuration (e.g., 12 downlink pilot time slot (DwPTS) symbols, 1 guard period (GP) symbol and 1 uplink pilot time slot (UpPTS) symbol, as in a normal cyclic prefix (CP)). For a full-duplex UE, this approach may be preferable. Alternatively, such special subframes in the FDD DL may be set to be a same special subframe configuration as that of the corresponding PCC special subframe. For a half-duplex UE, this alternative approach may be preferable.

In the example shown in FIG. 4, the reference subframe configuration for the FDD UL has special subframes for subframe 1 and subframe 6 as well. Again, several approaches are contemplated for handling special subframes in the FDD UL.

One approach is to treat such special subframes as regular DL subframes, non-usable for UL transmissions. When such an approach is used for the example shown, the UL transmissions may be restricted to subframes 2-4 and 7-9, and special subframes 1 and 6 in the reference subframe configuration for the FDD UL may be omitted for UL transmissions.

Another approach is to treat special subframes in the FDD UL based on the corresponding subframe configuration of the PCC. When such an approach is used, though not shown in the example of FIG. 4, the special subframe(s) in the reference subframe configuration for the FDD UL may be treated as regular DL subframe(s) if the corresponding subframe(s) in the subframe configuration of the PCC are DL subframe(s). As shown in the example, special subframes 1 and 6 in the reference subframe configuration for the FDD DL may be treated as special subframes because corresponding subframes 1 and 6 in the subframe configuration of the PCC are special subframes. Such special subframes in the FDD DL may be set, as appropriate or desired, to be some special subframe configuration (e.g., 2 UpPTS symbols). For a full-duplex UE, this approach may be preferable. Alternatively, such special subframes in the FDD UL may be set to be a same special subframe configuration as that of the corresponding PCC special subframe. For a half-duplex UE, this alternative approach may be preferable.

Yet another approach is to treat special subframes in the FDD UL as special subframes, and to set such special subframes to be some special subframe configuration (e.g., 2 UpPTS symbols) regardless of the type of subframes in the subframe configuration of the PCC. Thus, in such an approach, the type of the corresponding subframes in the TDD UL/DL configuration of the PCC will not affect or otherwise determine the treatment of special subframes in the FDD UL. This approach may be more applicable to a full-duplex UE.

The foregoing approaches (e.g., with a determination of reference subframe configurations for the FDD CC, the FCC DL and/or the FCC UL), may allow existing carrier aggregation designs to be used. For example, such approaches are compatible with the existing Release 10 and Release 11 carrier aggregation designs. Thus, potential challenges that may arise with designing a new scheme to support FDD+TDD CA (and other types of joint operation) may be reduced and/or avoided. For example, using reference subframe configurations for FDD CCs may allow the use of TDD+TDD CA HARQ timing designs (e.g., Rel-11 TDD+TDD CA, etc.) for TDD+FDD CA.

A potential downside to treating an FDD CC (e.g., FDD DL and/or UL) as a reference subframe configuration is that not all DL and UL subframes in the FDD CC may be fully utilized. In other words, depending upon the reference subframe configuration, some of the FDD DL subframes and/or some of the FDD UL subframes may not be available when such approaches are implemented. As discussed above, this is the case for subframe 2 in the FDD DL and for subframes 0, 1, 5 and 6 in the FDD UL shown in FIG. 4.

One approach for improving the utilization of such subframes is to allow scheduling in such subframes. In other words, the FDD DL may be treated as one reference subframe configuration and the FDD UL may be treated as another reference subframe configuration (e.g., the same reference configurations or different reference configurations) while allowing scheduling in subframes otherwise unavailable for respective DL/UL receptions/transmissions.

For such subframes in the FDD DL, e.g., subframe 2 in the example of FIG. 4, PDSCH may be scheduled. When there is no cross-carrier scheduling for the FDD CC by a TDD CC, PDSCH may be scheduled in such subframes by one or more control channels in the same subframes of the same FDD CC or of another FDD CC. In the example shown, a control channel (e.g., PDCCH/EPDCCH) may be provided in subframe 2 of the FDD DL to schedule PDSCH in subframe 2 of the FDD DL. As appropriate or desired, PDSCH may be semi-persistently scheduled in such subframes. When there is cross-carrier scheduling for the FDD CC by a TDD CC, cross-subframe scheduling may be enabled for such subframes. For example, one or more control channels in subframe 1 of the TDD CC may schedule PDSCH in such subframes.

Acknowledgement/negative acknowledgement (ACK/NAK) feedback may be provided for such subframes (e.g., uplink subframes in the reference subframe configuration of the FDD DL) used for scheduling. The ACK/NAK feedback may be bundled with ACK/NAK feedback of one or more other downlink subframes in the reference subframe configuration of the FDD DL. For example, ACK/NAK for FDD DL subframe 2 in FIG. 4 may be bundled in the time domain with ACK/NAK for FDD DL subframe 1.

For such subframes in the FDD UL, e.g., subframes 0, 1, 5 and 6 in the example of FIG. 4, PUSCH may be scheduled. When there is no cross-carrier scheduling for the FDD CC by a TDD CC, PUSCH may be scheduled in such subframes by one or more control channels in subframes of the same FDD CC or of another FDD CC. In the example shown, a control channel (e.g., PUCCH/EPUCCH) may be provided in subframe 2 of the FDD UL to schedule PUSCH in subframe 6 of the FDD UL. As appropriate or desired, PUSCH may be semi-persistently scheduled in such subframes. When there is cross-carrier scheduling for the FDD CC by a TDD CC, cross-subframe scheduling (e.g., for PUCCH/EPUCCH) or cross-subframe HARQ ACK (e.g., for PHICH) may be enabled for such subframes. For example, one or more control channels in subframe 1 of the TDD CC may schedule PUSCH in subframe 6 of the FDD UL. Alternatively, such scheduling may be via an FDD component carrier. If cross-subframe HARQ (e.g., via ACK/NAK bundling or increased PHICH resource pool) is not desired, it may be appropriate not to support non-adaptive UL retransmission via PHICH for such subframes.

Another potential downside is that there may be a limit on how many CCs may be aggregated in carrier aggregation for a UE. This may be the case, for example, when a TDD CC is the PCC and an FDD CC is the SCC, and TDD subframe configuration number 5 is involved (e.g., as the subframe configuration of a TDD CC or as a reference TDD subframe configuration of an FDD CC). This may be because TDD subframe configuration number 5 has a nine to one (9:1) DL:UL ratio. Thus, even with ACK/NAK spatial bundling, there may still be up to nine (9) ACK/NAK bits to be fed back by the UE for the particular CC. Since PUCCH format 3 for ACK/NAK may have limited capacity (e.g., up to twenty-two (22) bits in Release 11), up to two (2) CCs having TDD subframe configuration number 5 (actual or reference) may be supported.

This potential downside may be addressed by additional bundling of ACK/NAK. Alternatively or additionally, parallel PUCCH transmissions may be supported, for example, by employing two PUCCH format 3 transmissions by a UE in a subframe of a CC or by employing two or more CCs (e.g., a PUCCH format 3 transmission on an FDD CC and another PUCCH format 3 transmission on a TDD CC).

Yet another alternative for addressing this potential downside may be to avoid using TDD subframe configuration number 5 as a reference subframe configuration for an FDD CC. This may help aggregate more CCs in carrier aggregation for a UE. For example, aggregation of two (2) CCs each having TDD subframe configuration number 5 (actual or reference) generally may be less efficient for both DL and UL throughput than aggregation of five (5) CCs each having TDD subframe configuration number 2 (actual or reference). In the first aggregation, there are eighteen (18) DL subframes and two (2) UL subframes available to the UE. In the second aggregation, there are forty (40) DL subframes and ten (10) UL subframes available to the UE.

As mentioned above, issues may arise with FDD+TDD carrier aggregation if the UEs do not have full-duplex capabilities. Thus, an approach that supports half-duplex UEs for FDD+TDD carrier aggregation may be needed, particularly when an FDD CC is the PCC. One way to support half-duplex UEs in such cases may be by scheduling decision. For example, the half-duplex UE may determine whether or not to monitor DL or to transmit UL based on existing transmission/reception conditions. For example, if a UE is configured to transmit uplink signals in a periodic manner (e.g., periodic CSI, SRS, SR, etc.), the corresponding UL subframes may be treated by the UE as uplink subframes. For other subframes, the UE may dynamically monitor whether there is a DL transmission directed to the UE. If there is a DL transmission and the DL transmission requires HARQ feedback based on a HARQ timing, the corresponding UL subframe for HARQ feedback may also be treated as an UL subframe by the UE.

Another approach may be to proactively determine a reference subframe configuration to be used by half-duplex UEs for FDD CCs. Such determination may be made via explicit signaling (e.g., unicast or broadcast) or via implicit signaling (e.g., derivation).

Explicit signaling to a half-duplex UE may involve indicating a specific reference subframe configuration to use. For example, a signal may be transmitted to a half-duplex UE (or to multiple half-duplex UEs) that indicates that the reference subframe configuration for the FDD CC(s) is TDD UL/DL Configuration 1, providing six (6) DL subframes for the FDD DL and four (4) UL subframes for the FDD UL.

Implicit signaling to a half-duplex UE may involve indicating that the half-duplex UE(s) use the TDD UL/DL configuration of a TDD CC of its CCs as the reference subframe configuration. For example, a signal may be transmitted to a half-duplex UE (or to multiple half-duplex UEs) that indicates that the TDD UL/DL configuration of a TDD CC of its CCs is to be used. The UE, having a TDD CC with TDD UL/DL Configuration 2, then may determine that the reference subframe configuration for its FDD CC(s) is TDD UL/DL Configuration 2, providing eight (8) DL subframes for the FDD DL and two (2) UL subframes for the FDD UL.

If a half-duplex UE has multiple TDD CCs in its carrier aggregation, such implicit determination may further depend on one or more other parameters. For example, some radio resource control (RRC) configuration may indicate that the reference subframe configuration for the FDD CC(s) of the half-duplex UE is the TDD UL/DL configuration of its TDD CC having a lowest cell ID.

Figure 5:
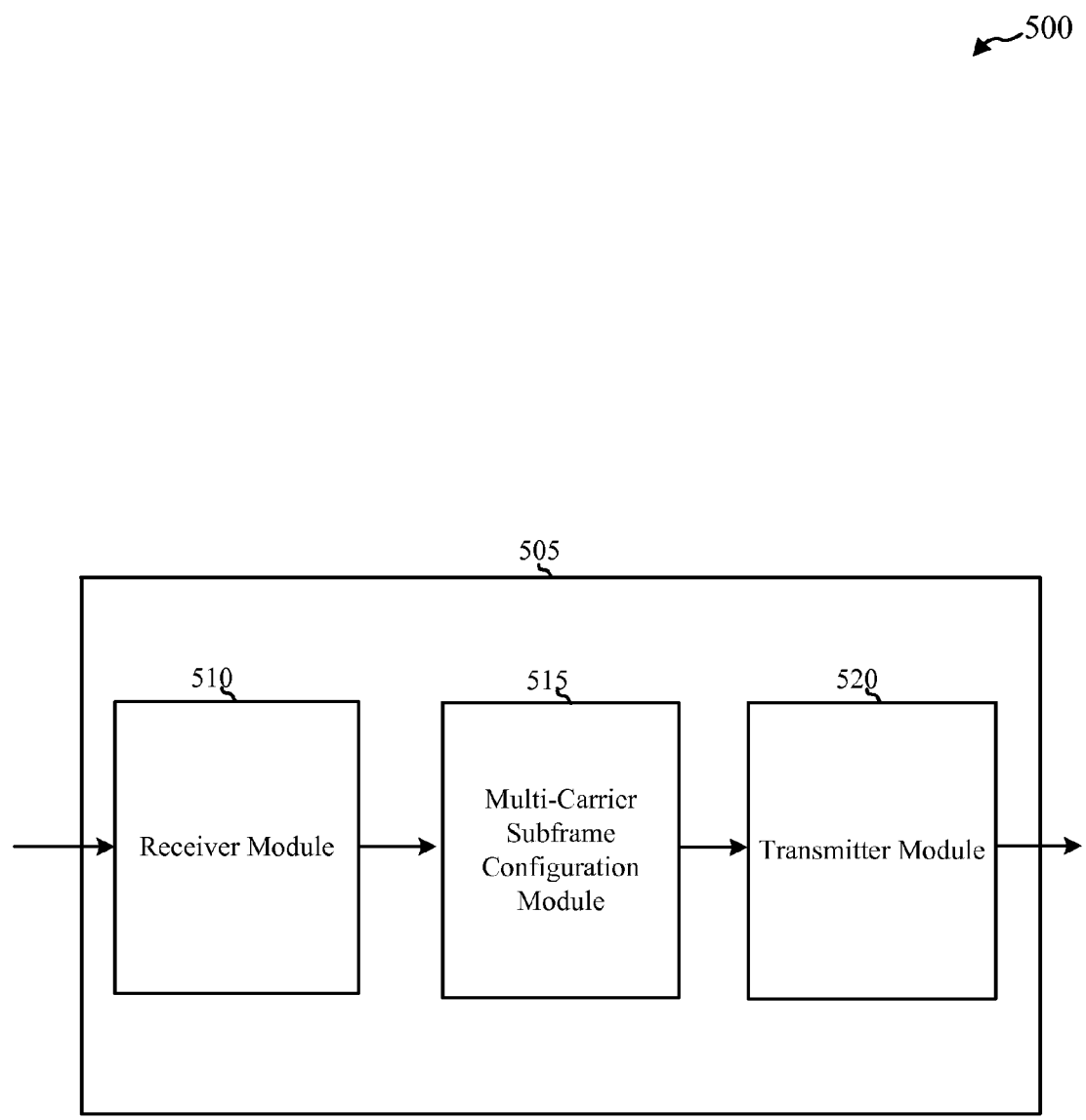
FIG. 5 shows an example of a device configured for multi-carrier communications.

Turning now to FIG. 5, which shows a block diagram 500 of a device 505 for multi-carrier communication in accordance with various embodiments. Device 505 may illustrate, for example, aspects of UEs 115 and/or 115-a illustrated in FIGS. 1 and/or 3. Additionally or alternatively, device 505 may illustrate aspects of base stations 105, 105-a and/or 105-c described with reference to FIGS. 1 and/or 3. Device 505 may include a receiver module 510, a multi-carrier subframe configuration module 515, and a transmitter module 520. Each of these components may be in communication with each other. In some embodiments, device 505 may be a processor.

Device 505 may be configured for operation in a CA scheme including a TDD CC and an FDD CC. The multi-carrier subframe configuration module 515 may be configured to determine TDD UL/DL configurations, such as described herein. In particular, the multi-carrier subframe configuration module 515 may be configured to determine reference subframe configurations for FDD CCs. Further, the multi-carrier subframe configuration module 515 may be configured to determine existing TDD UL/DL configurations of TDD CCs. Thus, the multi-carrier subframe configuration module 515 may be means for determining a TDD UL/DL configuration and/or means for determining a reference subframe configuration.

In some embodiments, the multi-carrier subframe configuration module 515 also may be configured to determine or identify a special subframe, an UL subframe and/or a downlink subframe in a subframe configuration. In such embodiments, the multi-carrier subframe configuration module 515 may be configured to determine how to treat such identified subframes and/or to treat such identified subframes in accordance with the various approaches described herein. As such, the multi-carrier subframe configuration module 515 may be means for performing these additional functions/operations, and may be, for example, means for managing implementation and/or use of subframe configurations and/or their subframes.

The receiver module 510 may receive wireless communications from a UE and/or from a base station. Such wireless communications may be received in accordance with the TDD UL/DL configurations and/or the reference subframe configurations determined and/or managed by the multi-carrier subframe configuration module 515. In some embodiments, the receiver module 510 may also be configured to receive signals that indicate TDD UL/DL configurations and/or reference subframe configurations to use. Thus, the receiver module 510 may be means for receiving communications and/or signals as described herein.

The transmitter module 520 may transmit wireless communications to a UE and/or to a base station. Such wireless communications may be transmitted in accordance with the TDD UL/DL configurations and/or the reference subframe configurations determined and/or managed by the multi-carrier subframe configuration module 515. In some embodiments, the transmitter module 520 may also be configured to transmit signals that indicate TDD UL/DL configurations and/or reference subframe configurations to use. Thus, the transmitter module 520 may be means for transmitting communications and/or signals as described herein. Either alone or in combination with other modules, the receiver module 510 and/or the transmitter module 520 may be means for communicating on an FDD carrier according to one or more reference subframe configurations. Similarly, either alone or in combination with other modules, the receiver module 510 and/or the transmitter module 520 may be means for communicating on a TDD carrier according to its TDD UL/DL configuration.

Figure 6:
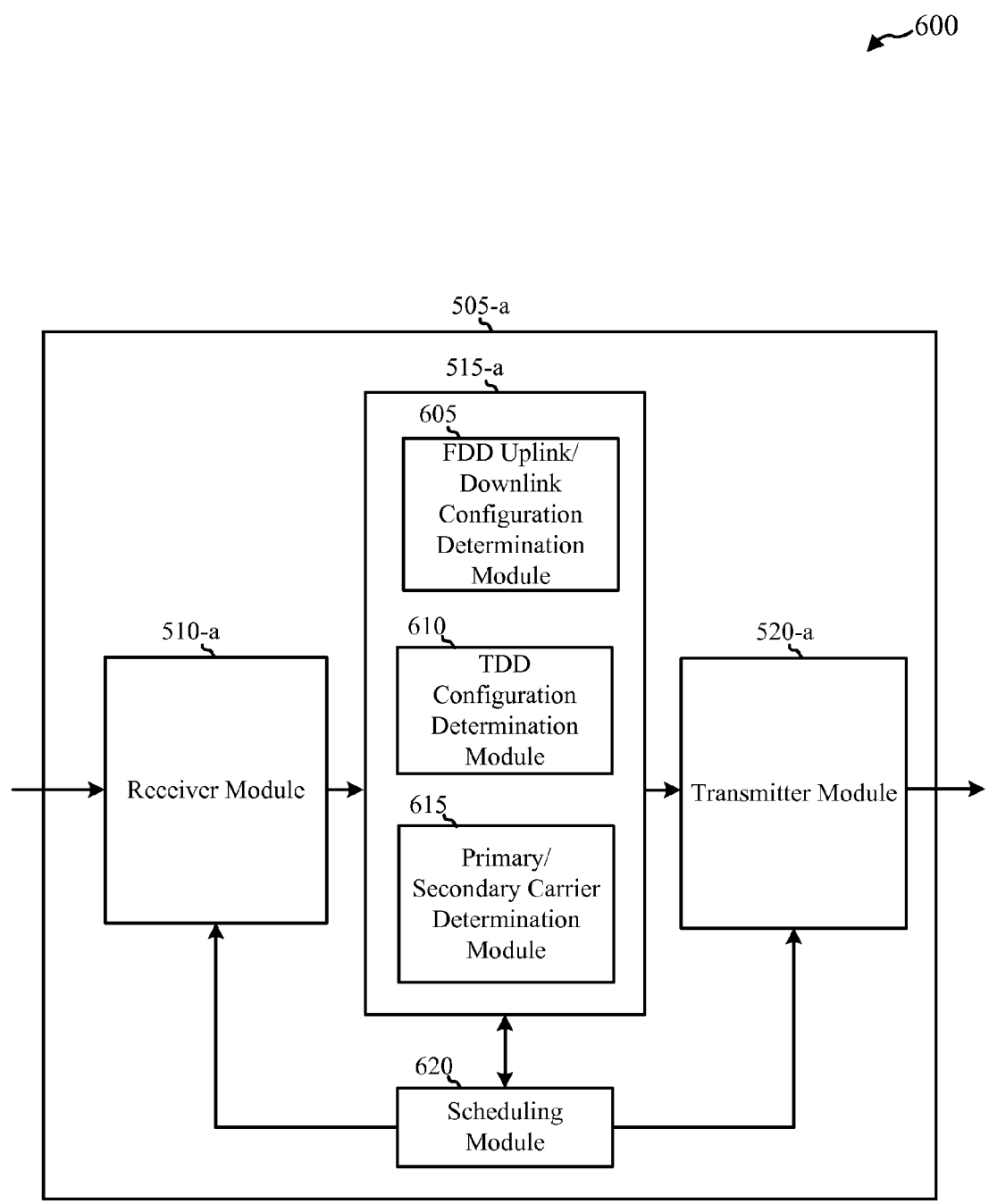
FIG. 6 shows another example of a device configured for multi-carrier communications.

Next, FIG. 6 shows a block diagram 600 of a device 505-a for multi-carrier communication in accordance with various embodiments. Device 505-a may illustrate, for example, aspects of UEs 115 and/or 115-a illustrated in FIGS. 1 and/or 3. In some cases, device 505-a illustrates aspects of base stations 105, 105-a and/or 105-b described with reference to FIGS. 1 and/or 3. Device 505-a may include a receiver module 510-a, a multi-carrier subframe configuration module 515-a, a scheduling module 620, and a transmitter module 520-a. Each of these components may be in communication with each other; and each may perform substantially the same functions as the corresponding modules illustrated in FIG. 5. According to some embodiments, device 505-a may be a processor.

The multi-carrier subframe configuration module 515-a may be configured with an FDD uplink/downlink configuration determination module 605, a TDD configuration determination module 610, and a primary/secondary carrier determination module 615. These modules, alone or in combination, may be means for performing various functions described herein. For example, the FDD uplink/downlink configuration determination module 605 may be configured to determine a reference subframe configuration for an FDD CC. In some embodiments, the FDD uplink/downlink configuration determination module 605 may be configured to determine a first reference subframe configuration for an FDD DL, and to determine a second reference subframe configuration for an FDD UL.

The TDD configuration determination module 610 may be configured to determine a TDD UL/DL subframe configuration for a TDD CC. The primary/secondary carrier determination module 615 may be configured to determine whether a TDD CC or an FDD CC is the PCC for a given implementation. Thus, the primary/secondary carrier determination module 615 may also determine the other CCs for the given implementation to be SCCs.

The scheduling module 620 may operate in cooperation with the receiver module 510-*a*, the multi-carrier subframe configuration module 515-*a*, and the transmitter module 520-*a* to perform scheduling of communications (e.g., transmissions and receptions) for the device 505-*a*. In some embodiments, the scheduling module 620 may be configured to utilize subframes that are not available for DL receptions and/or that are not available for UL transmissions. Thus, the scheduling module 620 may also be configured to perform scheduling as described herein. As such, the scheduling module 620 may be means for using an uplink subframe and/or a downlink subframe for scheduling, and may also be means for providing and/or bundling ACK/NAK feedback.

The components of the devices 505 and 505-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 7:
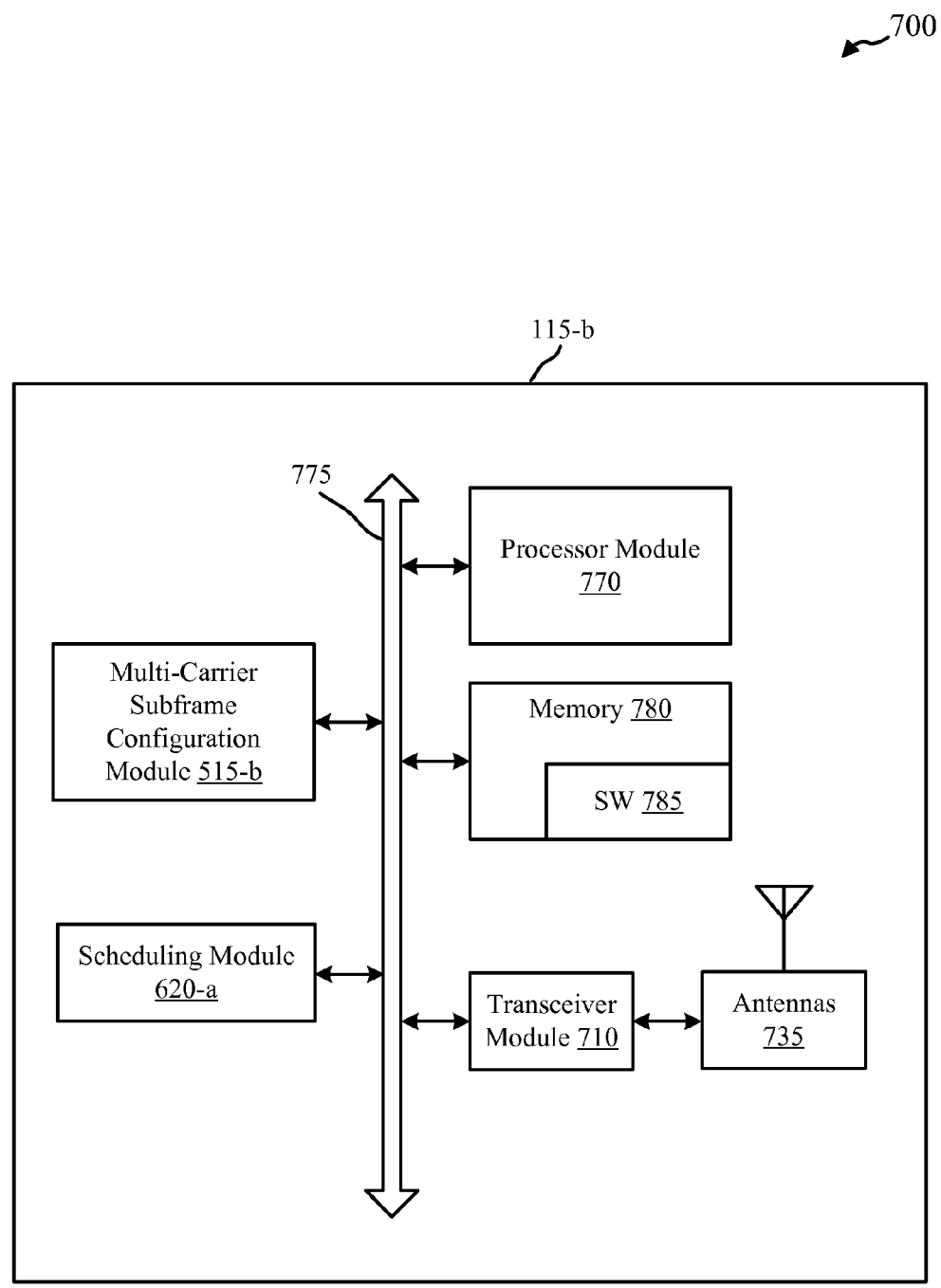
FIG. 7 shows a block diagram of a user equipment configured for multi-carrier communications.

Turning now to FIG. 7, a block diagram 700 of a UE 115-*b* configured for multi-carrier communication in accordance with various embodiments. The UE 115-*b* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The UE 115-*b* may have an internal power supply (not shown), such as a small battery, to facilitate mobile operation. In some embodiments, the UE 115-*b* may be the UEs 115 and/or 115-*a* of FIGS. 1 and/or 3.

The UE 115-*b* may generally include components for bi-directional voice and data communications including components for transmitting communications and components for receiving communications. The UE 115-*b* may include a transceiver module 710, antenna(s) 735, memory 780, and a processor module 770, which each may communicate, directly or indirectly, with each other (e.g., via one or more buses). The transceiver module 710 may be configured to communicate bi-directionally, via the antenna(s) 735 and/or one or more wired or wireless links, with one or more networks, as described above. For example, the transceiver module 710 may be configured to communicate bi-directionally with base stations 105, 105-*a* and/or 105-*b* of FIGS. 1 and/or 3. The transceiver module 710 may include a modem configured to modulate the packets and provide the modulated packets to the antenna(s) 735 for transmission, and to demodulate packets received from the antenna(s) 735. While the UE 115-*b* may include a single antenna 735, the UE 115-*b* may have multiple antennas 735 capable of concurrently transmitting and/or receiving multiple wireless transmissions. The transceiver module 710 may be capable of concurrently communicating with multiple base stations 105 via multiple component carriers.

The memory 780 may include random access memory (RAM) and read-only memory (ROM). The memory 780 may store computer-readable, computer-executable software/firmware code 785 containing instructions that are configured to, when executed, cause the processor module 770 to perform various functions described herein (e.g., determining, communicating, identifying, treating, omitting, using, scheduling, signal processing, managing, providing, bundling, etc.). Alternatively, the computer-executable software/firmware code 785 may not be directly executable by the processor module 770 but be configured to cause a computer (e.g., when compiled and executed) to perform functions described herein.

The processor module 770 may include an intelligent hardware device, e.g., a central processing unit (CPU), a microcontroller, an application-specific integrated circuit (ASIC), etc. The UE 115-*b* may include a speech encoder (not shown) configured to receive audio via a microphone, convert the audio into packets (e.g., 20 ms in length, 30 ms in length, etc.) representative of the received audio, provide the audio packets to the transceiver module 710, and provide indications of whether a user is speaking.

According to the architecture of FIG. 7, the UE 115-*b* may further include a multi-carrier subframe configuration module 515-*b*, which may be substantially the same as the multi-carrier subframe configuration modules 515 and/or 515-*a* of FIGS. 5 and/or 6. In some cases, the multi-carrier subframe configuration module 515-*b* may be configured to perform the functions of the modules 605, 610 and/or 615 of FIG. 6. By way of example, the multi-carrier subframe configuration module 515-*b* may be a component of the UE 115-*b* in communication with some or all of the other components of the UE 115-*b* via a bus 775. Alternatively, functionality of these modules may be implemented as a component of the transceiver module 710, as a computer program product, and/or as one or more controller elements of the processor module 770.

The UE 115-*b* may be configured to perform multi-carrier scheduling as described herein, and may include a scheduling module 620-*a* to perform such functions/operations. The components for UE 115-*b* may be configured to implement aspects discussed above with respect to UEs 115 and/or 115-*a* of FIGS. 1 and/or 3, and/or devices 505 and/or 505-*a* of FIGS. 5 and/or 6. For example, the UE 115-*b* may be configured to determine reference subframe configurations for FDD CCs.

Figure 8:
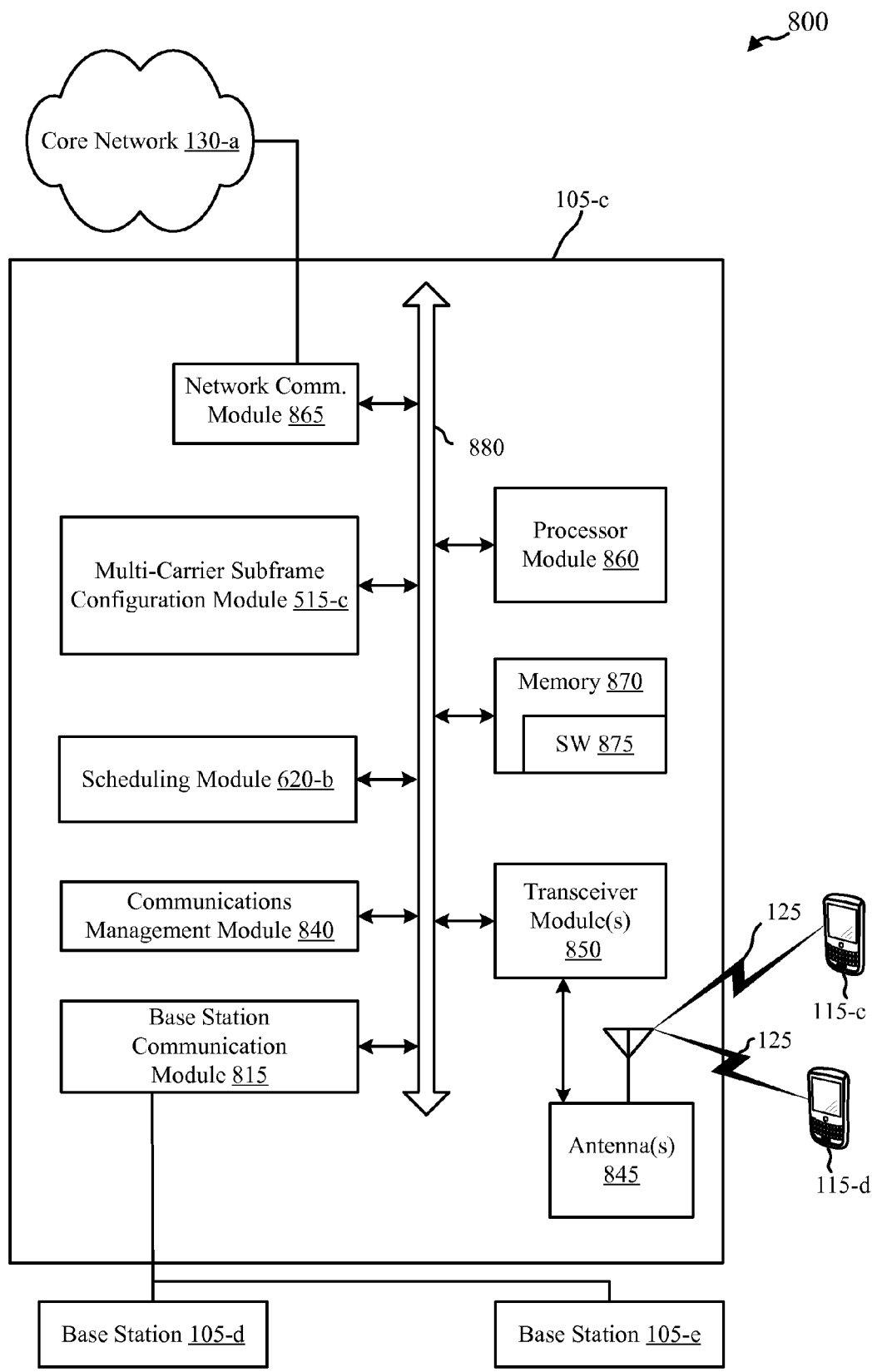
FIG. 8 shows a block diagram of communications system, including a base station, configured for multi-carrier communications.

FIG. 8 shows a block diagram of a wireless communications system 800 that may be configured for multi-carrier communications in accordance with various embodiments. This wireless communications system 800 may be an example of aspects of the wireless communications systems 100 and/or 300 depicted in FIGS. 1 and/or 3. The wireless communications system 800 may include a base station 105-*c* configured for communication with UEs 115 (e.g., UEs 115-*c* and 115-*d*) over wireless communication links 125. Base station 105-*c* may be capable of receiving communication links from other base stations (not shown). Base station 105-*c* may be, for example, a base station 105, 105-*a* and/or 105-*b* as illustrated in wireless communications systems 100 and/or 300 described with reference to FIGS. 1 and/or 3.

In some cases, the base station 105-*c* may have one or more wired backhaul links. Base station 105-*c* may be, for example, a macro base station 105 having a wired backhaul link (e.g., S1 interface, etc.) to the core network 130-*a*. Base station 105-*c* may also communicate with other base stations 105, such as base station 105-*d* and base station 105-*d* via inter-base station communication links (e.g., X2 interface, etc.). Each of the base stations 105 may communicate with UEs 115 using the same or different wireless communications technologies. In some cases, base station 105-*c* may communicate with other base stations such as 105-*d* and/or 105-*e* utilizing a base station communication module 815. In some embodiments, base station communication module 815 may provide an X2 interface within an LTE/LTE-A wireless communication network technology to provide communication between some of the base stations 105. In some embodiments, base station 105-*c* may communicate with other base stations through core network 130-*a*. In some cases, the base station 105-*c* may communicate with the core network 130-*a* through a network communications module 865.

The components for base station 105-*c* may be configured to implement aspects discussed above with respect to base stations 105, 105-*a* and/or 105-*b* of FIGS. 1 and/or 3, and/or devices 505 and/or 505-*a* of FIGS. 5 and/or 6, which may not be repeated here for the sake of brevity. For example, the base station 105-*c* may be configured to determine reference subframe configurations for FDD CCs.

The base station 105-*c* may include antennas 845, transceiver module(s) 850, memory 870, and a processor module 860, which each may be in communication, directly or indirectly, with each other (e.g., over bus system 880). The transceiver module(s) 850 may be configured to communicate bi-directionally, via the antennas 845, with the UEs 115, which may be multi-mode devices. The transceiver module(s) 850 (and/or other components of the base station 105-*c*) may also be configured to communicate bi-directionally, via the antennas 845, with one or more other base stations. The transceiver module(s) 850 may include a modem configured to modulate packets and provide the modulated packets to the antennas 845 for transmission, and to demodulate packets received from the antennas 845. The base station 105-*c* may include multiple transceiver modules 850, each with one or more associated antennas 845.

The memory 870 may include random access memory (RAM) and read-only memory (ROM). The memory 870 may also store computer-readable, computer-executable software code 875 containing instructions that are configured to, when executed, cause the processor module 860 to perform various functions described herein (e.g., determining, communicating, identifying, treating, omitting, using, scheduling, signal processing, managing, providing, bundling, etc.). Alternatively, the computer-executable software code 875 may not be directly executable by the processor module 860 but be configured to cause the computer, e.g., when compiled and executed, to perform functions described herein.

The processor module 860 may include an intelligent hardware device, e.g., a central processing unit (CPU), a microcontroller, an application-specific integrated circuit (ASIC), etc. The processor module 860 may include various special purpose processors such as encoders, queue processing modules, base band processors, radio head controllers, digital signal processors (DSPs), and the like.

According to the architecture of FIG. 8, the base station 105-*c* may further include a communications management module 840. The communications management module 840 may manage communications with UEs and other base stations 105. The communications management module 840 may include a controller and/or scheduler for controlling communications with UEs 115 in cooperation with other base stations 105. For example, the communications management module 840 may perform scheduling for transmissions to UEs 115 and/or various interference mitigation techniques such as beamforming and/or joint transmission.

Additionally or alternatively, the base station 105-*c* may include a multi-carrier subframe configuration module 515-*c*, which may be configured substantially the same as modules 515, 515-*a* and/or 515-*b* of FIGS. 5, 6 and/or 7. In some cases, the multi-carrier subframe configuration module 515-*c* may be configured to perform the functions of the modules 605, 610 and/or 615 of FIG. 6. In some embodiments, the multi-carrier subframe configuration module 515-*c* is a component of the base station 105-*c* in communication with some or all of the other components of the base station 105-*c* via a bus. Alternatively, functionality of the multi-carrier subframe configuration module 515-*c* may be implemented as a component of the transceiver module(s) 850, as a computer program product, as one or more controller elements of the processor module 860, and/or as an element of the communications management module 840.

The base station 105-*c* may be configured to perform multi-carrier scheduling as described herein, and may include a scheduling module 620-*b* to perform such functions/operations. Such functionality may also be performed by various other modules, either alone or in combination, such as the processor module 860, the memory 870 and/or the transceiver module(s) 850.

Figure 9:
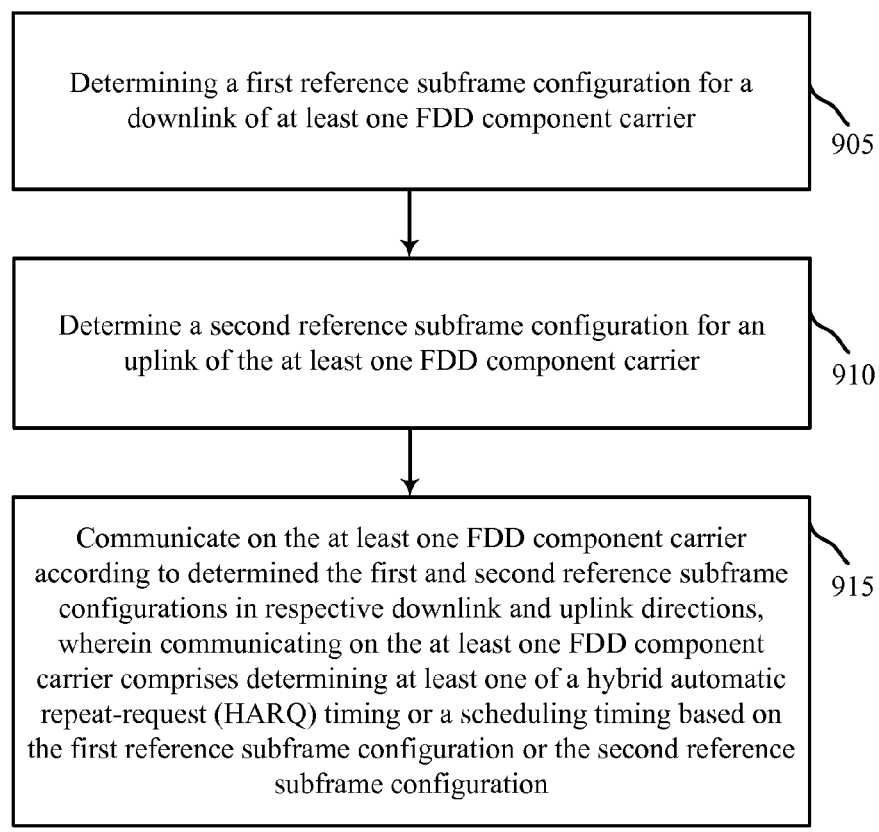
FIG. 9 shows a flowchart illustrating an example of a method of multi-carrier communication.

Next, FIG. 9 shows a flowchart illustrating an example of a method 900 for multi-carrier communication according to various embodiments. The method 900 may be implemented by the base stations 105, 105-*a*, 105-*b*, 105-*c*, and/or the UEs 115, 115-*a*, 115-*b*, 115-*c* of FIGS. 1, 3, 7 and/or 8, and/or by the devices 505 and/or 505-*a* of FIGS. 5 and/or 6.

At block 905, the method may include determining a first reference subframe configuration for a downlink of at least one FDD component carrier. The operations at block 905, in some embodiments, may be performed by the multi-carrier subframe configuration modules 515, 515-*a*, 515-*b* and/or 515-*c* of FIGS. 5, 6, 7 and/or 8. In some embodiments, the first reference subframe configuration is one of an existing set of TDD UL/DL configurations.

At block 910, the method may involve determining a second reference subframe configuration for an uplink of the at least one FDD component carrier. The operations at block 910 also may be performed by the multi-carrier subframe configuration modules 515, 515-*a*, 515-*b* and/or 515-*c* of FIGS. 5, 6, 7 and/or 8. In some embodiments, the second reference subframe configuration is one of an existing set of TDD UL/DL configurations. Further, the second reference subframe configuration may be the same as or different from the first reference subframe configuration.

At block 915, the method may involve communicating on the at least one FDD component carrier according to the determined first and second reference subframe configurations in respective downlink and uplink directions. The communicating on the at least one FDD component carrier may include determining at least one of a hybrid automatic repeat-request (HARQ) timing or a scheduling timing based on the first reference subframe configuration or the second reference subframe configuration. In certain examples, HARQ timing may refer to a timing between a physical downlink shared channel (PDSCH) transmission or a physical uplink shared channel (PUSCH) transmission and a corresponding ACK/NAK message. Scheduling timing may refer to a timing between a physical downlink control channel (PDCCH) or enhanced/evolved PDCCH (EPD-CCH) and a PDSCH or PUSCH. The operations at block 915, in various embodiments, may be performed by the receiver modules 510 and/or 510-*a* of FIGS. 5 and/or 6, the transmitter modules 520 and/or 520-*a* of FIGS. 5 and/or 6, and/or the transceiver module 710 and/or 850 of FIGS. 7 and/or 8.

Figure 10:
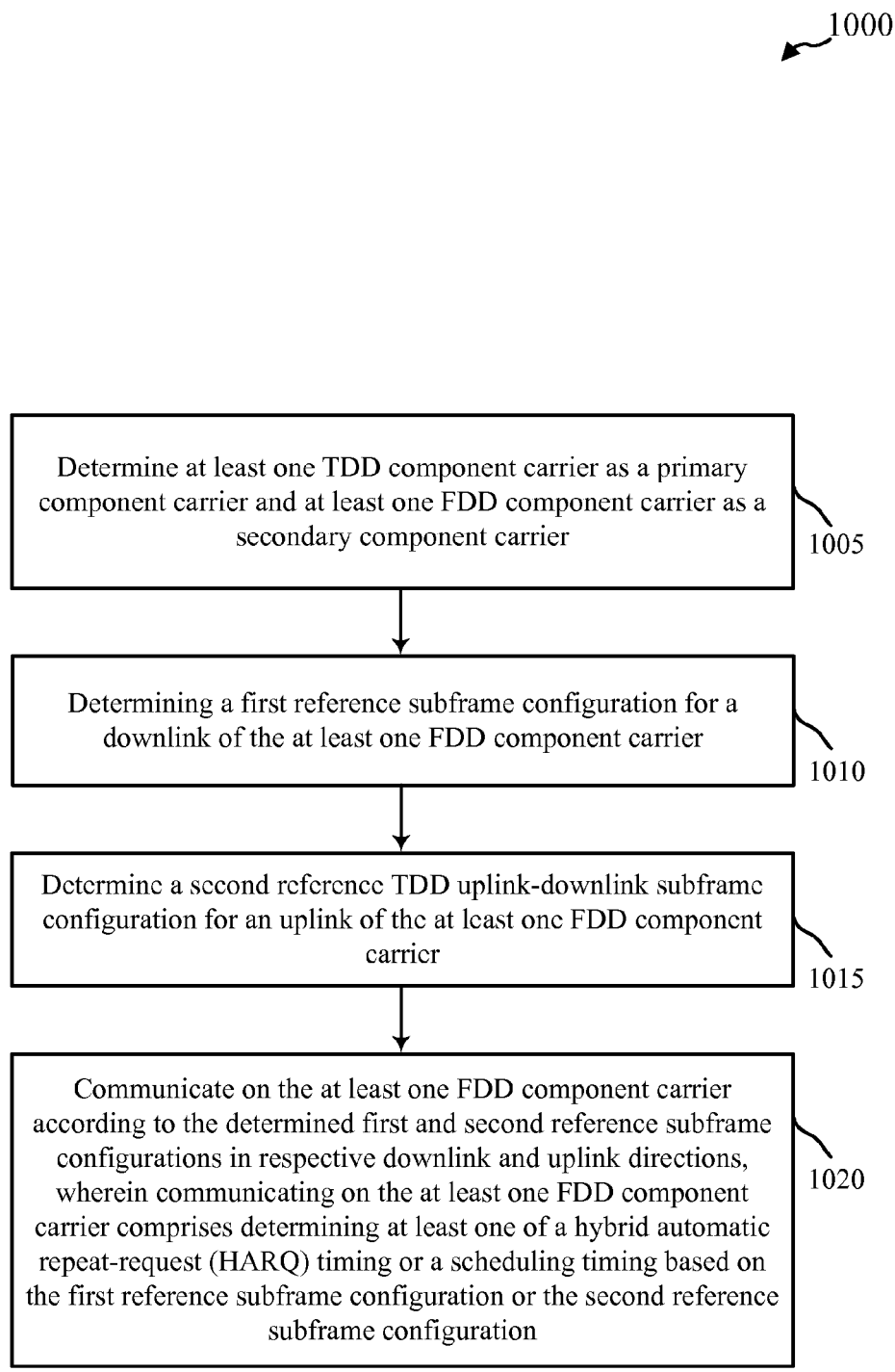
FIG. 10 shows a flowchart illustrating another example of a method of multi-carrier communication.

Next, FIG. 10 shows a flowchart illustrating another example of a method 1000 for multi-carrier communication according to various embodiments. The method 1000 may be implemented by the base stations 105, 105-*a*, 105-*b*, 105-*c*, and/or the UEs 115, 115-*a*, 115-*b*, 115-*c* of FIGS. 1, 3, 7 and/or 8, and/or by the devices 505 and/or 505-*a* of FIGS. 5 and/or 6.

At block 1005, the method may include determining at least one TDD component carrier as a primary component carrier and at least one FDD component carrier as a secondary component carrier. The operations at block 1005 may, in some embodiments, be performed by the multi-carrier subframe configuration modules 515, 515-*a*, 515-*b* and/or 515-*c* of FIGS. 5, 6, 7 and/or 8. In particular, the operations at block 1005 may be performed by the primary/secondary carrier determination module 615 of the multi-carrier subframe configuration module 515-*a* of FIG. 6. In some embodiments, the determination made at block 1005 may be used to determine whether further operations of the method are to be performed. As noted above, for example, various approaches described herein may be helpful when the TDD component carrier is the PCC.

At block 1010, the method may involve determining a first reference subframe configuration for a downlink of at least one FDD component carrier. At block 1015, the method may involve determining a second reference subframe configuration for an uplink of the at least one FDD component carrier. At block 1020, the method may include communicating on the at least one FDD component carrier according to the determined first and second reference subframe configurations in respective downlink and uplink directions. The communicating on the at least one FDD component carrier may include determining at least one of a hybrid automatic repeat-request (HARQ) timing or a scheduling timing based on the first reference subframe configuration or the second reference subframe configuration. In certain examples, HARQ timing may refer to a timing between a physical downlink shared channel (PDSCH) transmission or a physical uplink shared channel (PUSCH) transmission and a corresponding ACK/NAK message. Scheduling timing may refer to a timing between a physical downlink control channel (PDCCH) or enhanced/evolved PDCCH (EPD-CCH) and a PDSCH or PUSCH. These operations may be performed substantially as described above, for example, with respect to FIG. 9.

Figure 11:
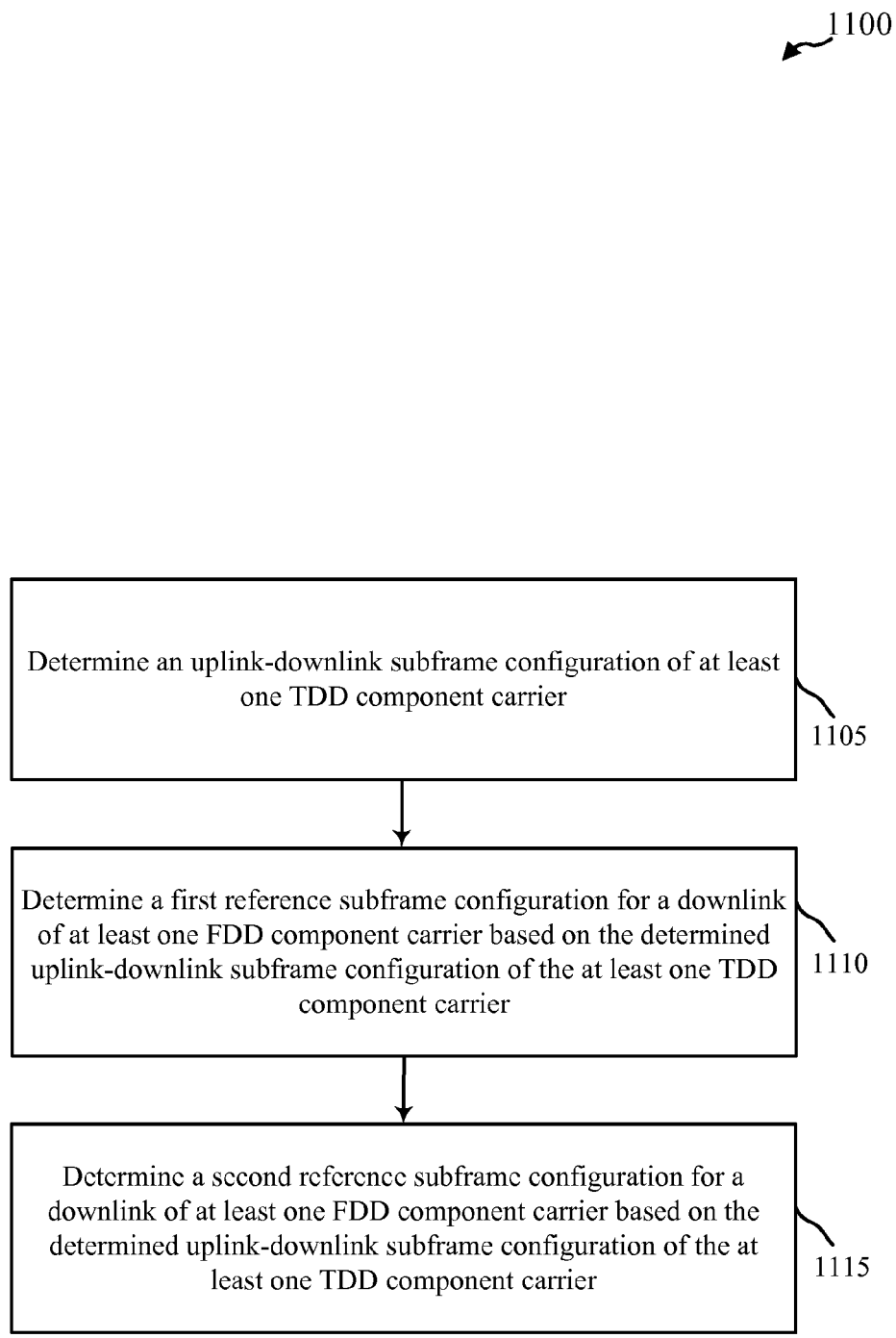
FIG. 11 shows a flowchart illustrating another example of a method of multi-carrier communication.

FIG. 11 shows a flowchart illustrating another example of a method 1100 for multi-carrier communication according to various embodiments. The method 1100 may be implemented by the base stations 105, 105-*a*, 105-*b*, 105-*c*, and/or the UEs 115, 115-*a*, 115-*b*, 115-*c* of FIGS. 1, 3, 7 and/or 8, and/or by the devices 505 and/or 505-*a* of FIGS. 5 and/or 6. Further, the method 1100 may be employed in conjunction with various other methods described herein, such as the methods 900 and/or 1000 depicted in FIGS. 9 and/or 10, respectively.

At block 1105, the method may include determining a TDD UL/DL subframe configuration for at least one TDD component carrier. The operations at block 1105, in some embodiments, may be performed by the multi-carrier subframe configuration modules 515, 515-*a*, 515-*b* and/or 515-*c* of FIGS. 5, 6, 7 and/or 8. In particular, the operations at block 1105 may be performed by the TDD configuration determination module 610 of the multi-carrier subframe configuration module 515-*a* of FIG. 6.

At block 1110, the method may involve determining a first reference subframe configuration for a downlink of at least one FDD component carrier based on the TDD UL/DL subframe configuration of the at least one TDD component carrier determined at block 1105. At block 1115, the method may involve determining a second reference subframe configuration for an uplink of at least one FDD component carrier based on the TDD UL/DL subframe configuration of the at least one TDD component carrier determined at block 1105. In some embodiments, the operations at block 1110 may be performed to determine the first reference subframe configuration to be the same as the TDD UL/DL subframe configuration of the at least one TDD component carrier determined at block 1105.

Figure 12:
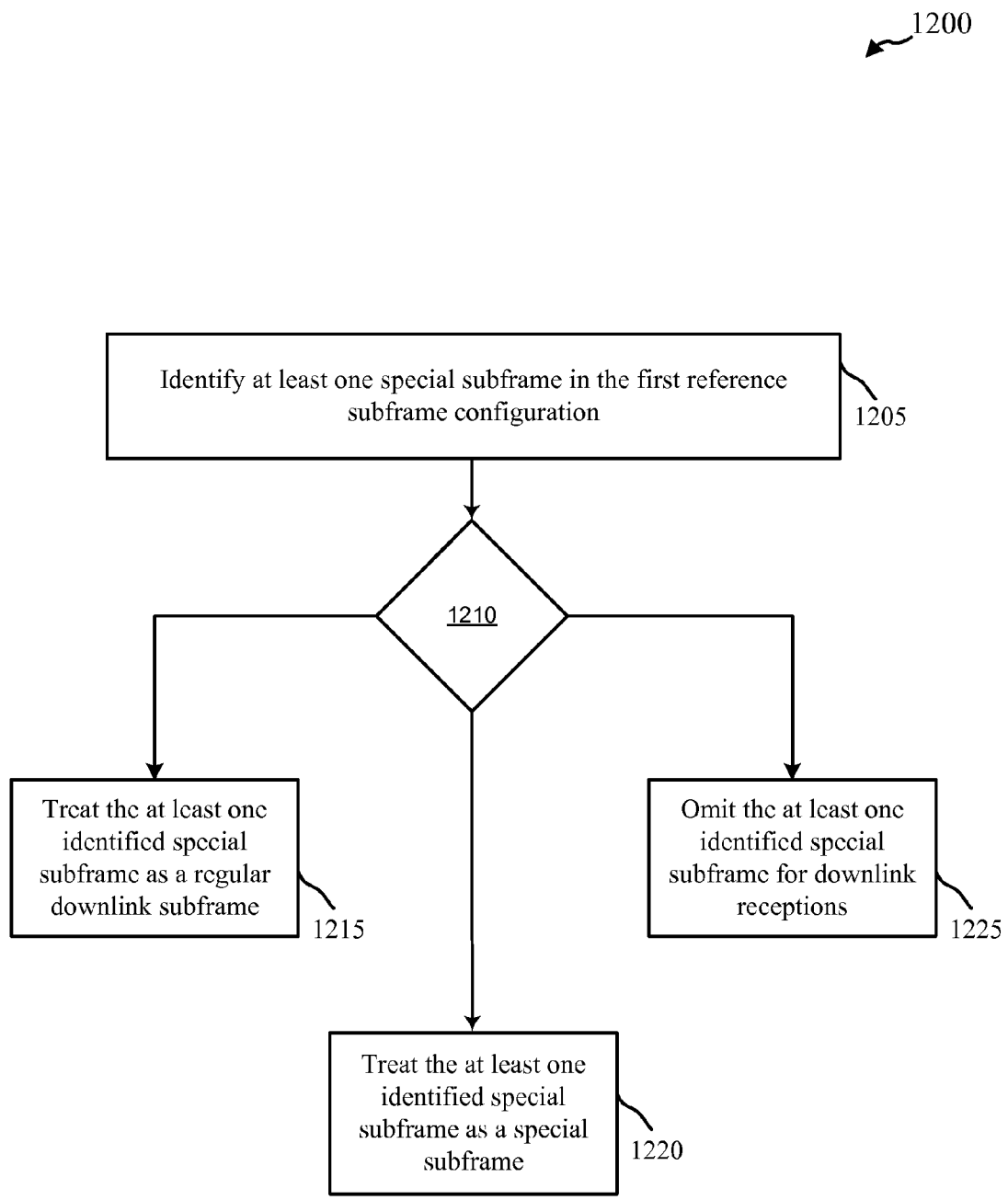
FIG. 12 shows a flowchart illustrating another example of a method of multi-carrier communication.

FIG. 12 shows a flowchart illustrating another example of a method 1200 for multi-carrier communication according to various embodiments. The method 1200 may be implemented by the base stations 105, 105-*a*, 105-*b*, 105-*c*, and/or the UEs 115, 115-*a*, 115-*b*, 115-*c* of FIGS. 1, 3, 7 and/or 8, and/or by the devices 505 and/or 505-*a* of FIGS. 5 and/or 6. Further, the method 1200 may be employed in conjunction with various other methods described herein, such as the methods 900, 1000 and/or 1100 depicted in FIGS. 9, 10 and/or 11, respectively.

At block 1205, the method may include identifying at least one special subframe in the first reference subframe configuration. The operations at block 1205, in some embodiments, may be performed by the multi-carrier subframe configuration modules 515, 515-*a*, 515-*b* and/or 515-*c* of FIGS. 5, 6, 7 and/or 8.

At block 1210, the method may involve making a determination or a decision as to how the at least one special subframe identified at block 1205 is to be treated. One result of the determination/decision at block 1210 may be to proceed to block 1215. At block 1215, the method may involve treating the at least one identified special subframe as a regular downlink subframe. Alternatively, another result of the determination/decision at block 1210 may be to proceed to block 1220. At block 1220, the method may involve treating the at least one identified special subframe as a special subframe, such as described above. Yet another result of the determination/decision at block 1210 may be to proceed to block 1225. At block 1225, the method may involve omitting the at least one identified special subframe for downlink receptions. Each of the operations at blocks 1210, 1215, 1220 and 1225, in some embodiments, may be performed by the multi-carrier subframe configuration modules 515, 515-*a*, 515-*b* and/or 515-*c* of FIGS. 5, 6, 7 and/or 8.

Figure 13:
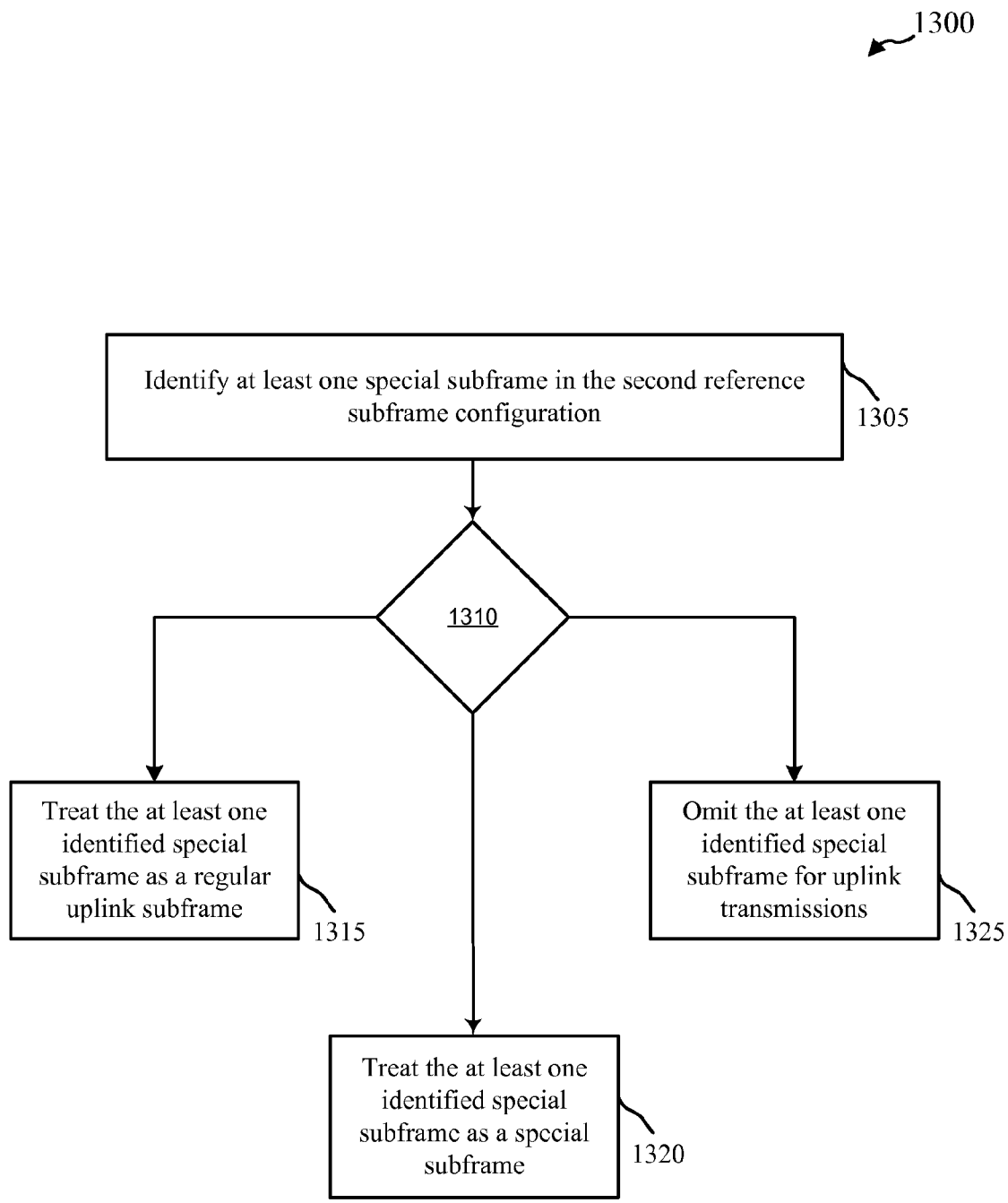
FIG. 13 shows a flowchart illustrating another example of a method of multi-carrier communication.

FIG. 13 shows a flowchart illustrating another example of a method 1300 for multi-carrier communication according to various embodiments. The method 1300 may be implemented by the base stations 105, 105-*a*, 105-*b*, 105-*c*, and/or the UEs 115, 115-*a*, 115-*b*, 115-*c* of FIGS. 1, 3, 7 and/or 8, and/or by the devices 505 and/or 505-*a* of FIGS. 5 and/or 6.

Further, the method 1300 may be employed in conjunction with various other methods described herein, such as the methods 900, 1000, 1100 and/or 1200 depicted in FIGS. 9, 10, 11 and/or 12, respectively.

At block 1305, the method may include identifying at least one special subframe in the second reference subframe configuration. The operations at block 1305, in some embodiments, may be performed by the multi-carrier subframe configuration modules 515, 515-a, 515-b and/or 515-c of FIGS. 5, 6, 7 and/or 8.

At block 1310, the method may involve making a determination or a decision as to how the at least one special subframe identified at block 1305 is to be treated. One result of the determination/decision at block 1310 may be to proceed to block 1315. At block 1315, the method may involve treating the at least one identified special subframe as a regular uplink subframe. Alternatively, another result of the determination/decision at block 1310 may be to proceed to block 1320. At block 1320, the method may involve treating the at least one identified special subframe as a special subframe, such as described above. Yet another result of the determination/decision at block 1310 may be to proceed to block 1325. At block 1325, the method may involve omitting the at least one identified special subframe for uplink transmissions. Each of the operations at blocks 1310, 1315, 1320 and 1325, in some embodiments, may be performed by the multi-carrier subframe configuration modules 515, 515-a, 515-b and/or 515-c of FIGS. 5, 6, 7 and/or 8.

Figure 14:
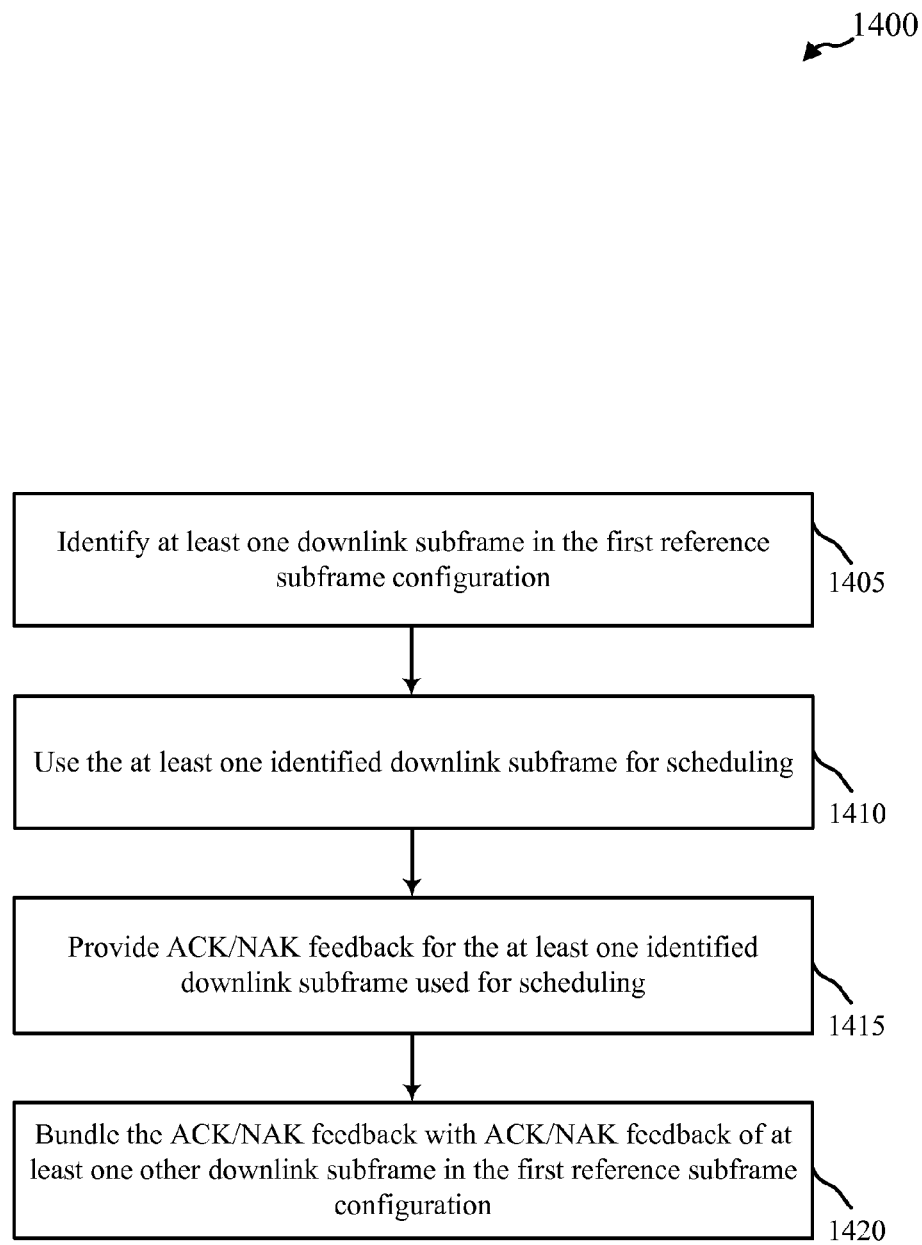
FIG. 14 shows a flowchart illustrating another example of a method of multi-carrier communication.

FIG. 14 shows a flowchart illustrating another example of a method 1400 for multi-carrier communication according to various embodiments. The method 1400 may be implemented by the base stations 105, 105-a, 105-b, 105-c, and/or the UEs 115, 115-a, 115-b, 115-c of FIGS. 1, 3, 7 and/or 8, and/or by the devices 505 and/or 505-a of FIGS. 5 and/or 6. Further, the method 1400 may be employed in conjunction with various other methods described herein, such as the methods 900, 1000, 1100, 1200 and/or 1300 depicted in FIGS. 9, 10, 11, 12 and/or 13, respectively.

At block 1405, the method may include identifying at least one downlink subframe in the first reference subframe configuration. The operations at block 1405 may, in some embodiments, be performed by the multi-carrier subframe configuration modules 515, 515-a, 515-b and/or 515-c of FIGS. 5, 6, 7 and/or 8. In particular, the operations at block 1105 may be performed by the FDD uplink/downlink configuration determination module 605 of the multi-carrier subframe configuration module 515-a of FIG. 6.

At block 1410, the method may involve using the at least one downlink subframe, identified at block 1405, for scheduling. The operations at block 1410, in some embodiments, may be performed by the scheduling modules 620, 620-a and/or 620-b of FIGS. 6, 7 and/or 8, respectively. In particular, the scheduling operations performed at block 1410 may implement various scheduling functionality described herein.

At block 1415, the method may involve providing ACK/NAK feedback for the at least one identified downlink subframe. The ACK/NAK feedback may be provided in a same uplink subframe with the ACK/NAK feedback for at least one downlink subframe part of the reference subframe configuration. At block 1420, the method may involve bundling the ACK/NAK feedback, provided at block 1415, with ACK/NAK feedback of at least one other downlink subframe in the first reference subframe configuration. The operations at blocks 1415 and/or 1420, in some embodiments, may be performed by the scheduling modules 620, 620-a and/or 620-b of FIGS. 6, 7 and/or 8, respectively.

Figure 15:
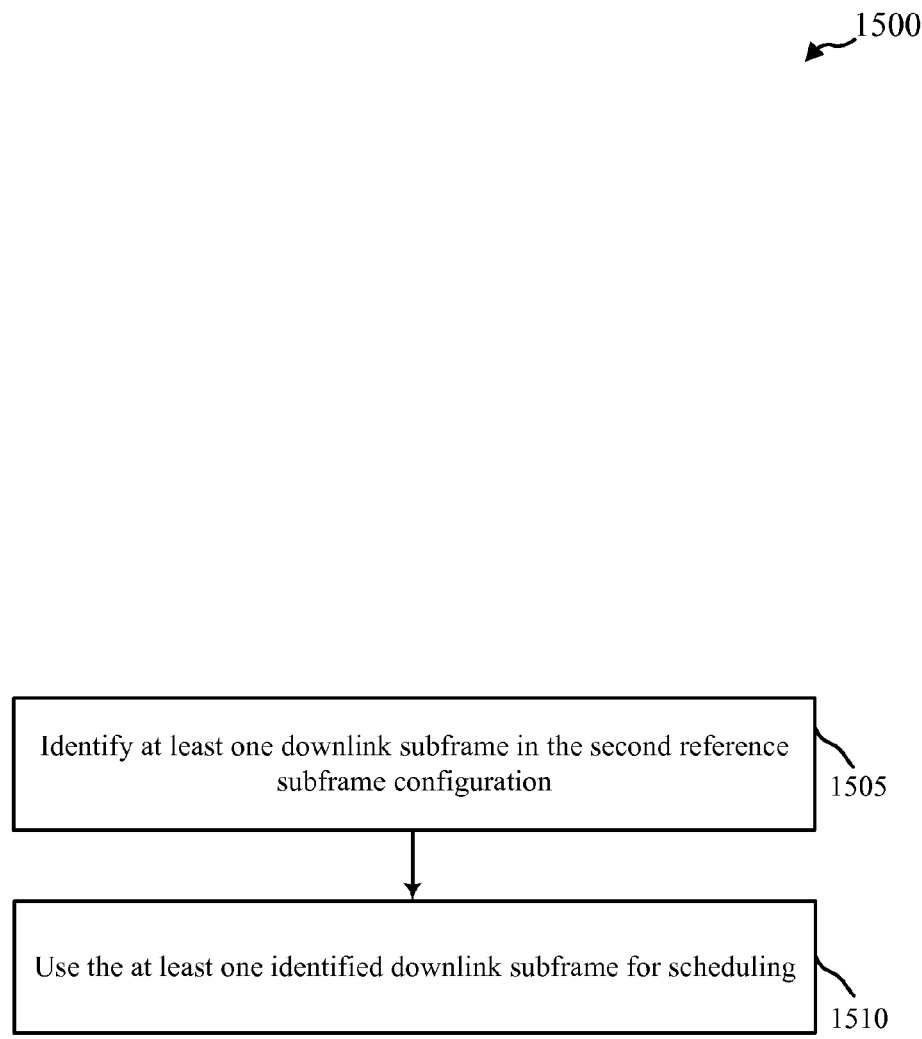
FIG. 15 shows a flowchart illustrating another example of a method of multi-carrier communication.

FIG. 15 shows a flowchart illustrating another example of a method 1500 for multi-carrier communication according to various embodiments. The method 1500 may be implemented by the base stations 105, 105-a, 105-b, 105-c, and/or the UEs 115, 115-a, 115-b, 115-c of FIGS. 1, 3, 7 and/or 8, and/or by the devices 505 and/or 505-a of FIGS. 5 and/or 6. Further, the method 1500 may be employed in conjunction with various other methods described herein, such as the methods 900, 1000, 1100, 1200, 1300 and/or 1400 depicted in FIGS. 9, 10, 11, 12, 13 and/or 14, respectively.

At block 1505, the method may include identifying at least one downlink subframe in the second reference subframe configuration. The operations at block 1505, in some embodiments, may be performed by the multi-carrier subframe configuration modules 515, 515-a, 515-b and/or 515-c of FIGS. 5, 6, 7 and/or 8. In particular, the operations at block 1505 may be performed by the FDD uplink/downlink configuration determination module 605 of the multi-carrier subframe configuration module 515-a of FIG. 6.

At block 1510, the method may involve using the at least one downlink subframe, identified at block 1505, for scheduling. The operations at block 1510, in some embodiments, may be performed by the scheduling modules 620, 620-a and/or 620-b of FIGS. 6, 7 and/or 8, respectively. In particular, the scheduling operations performed at block 1510 may implement various scheduling functionality described herein.

Figure 16:
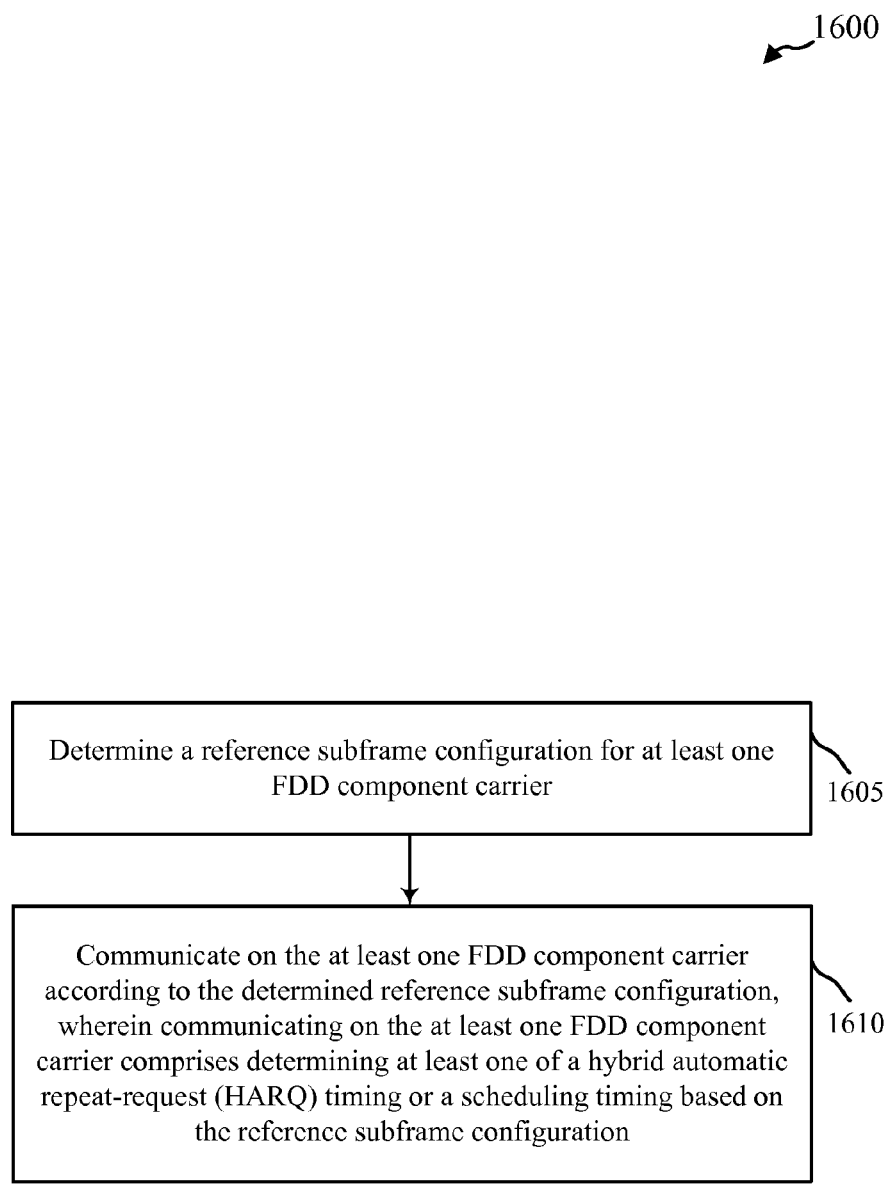
FIG. 16 shows a flowchart illustrating another example of a method of multi-carrier communication.

FIG. 16 shows a flowchart illustrating an example of a method 1600 for multi-carrier communication according to various embodiments. The method 1600 may be implemented by the base stations 105, 105-a, 105-b, 105-c, and/or the UEs 115, 115-a, 115-b, 115-c of FIGS. 1, 3, 7 and/or 8, and/or by the devices 505 and/or 505-a of FIGS. 5 and/or 6.

At block 1605, the method may involve determining a reference subframe configuration for at least one FDD component carrier. The operations at block 1605, in some embodiments, may be performed by the multi-carrier subframe configuration modules 515, 515-a, 515-b and/or 515-c of FIGS. 5, 6, 7 and/or 8. In some embodiments, the reference subframe configuration is one of an existing set of TDD UL/DL configurations.

At block 1610, the method may involve communicating on the at least one FDD component carrier according to the determined reference subframe configuration. The communicating on the at least one FDD component carrier may include determining at least one of a hybrid automatic repeat-request (HARQ) timing or a scheduling timing based on the reference subframe configuration. In certain examples, HARQ timing may refer to a timing between a physical downlink shared channel (PDSCH) transmission or a physical uplink shared channel (PUSCH) transmission and a corresponding ACK/NAK message. Scheduling timing may refer to a timing between a physical downlink control channel (PDCCH) or enhanced/evolved PDCCH (EPDCCH) and a PDSCH or PUSCH. The operations at block 1610, in various embodiments, may be performed by the receiver modules 510 and/or 510-a of FIGS. 5 and/or 6, the transmitter modules 520 and/or 520-a of FIGS. 5 and/or 6, and/or the transceiver module 710 and/or 850 of FIGS. 7 and/or 8.

Figure 17:
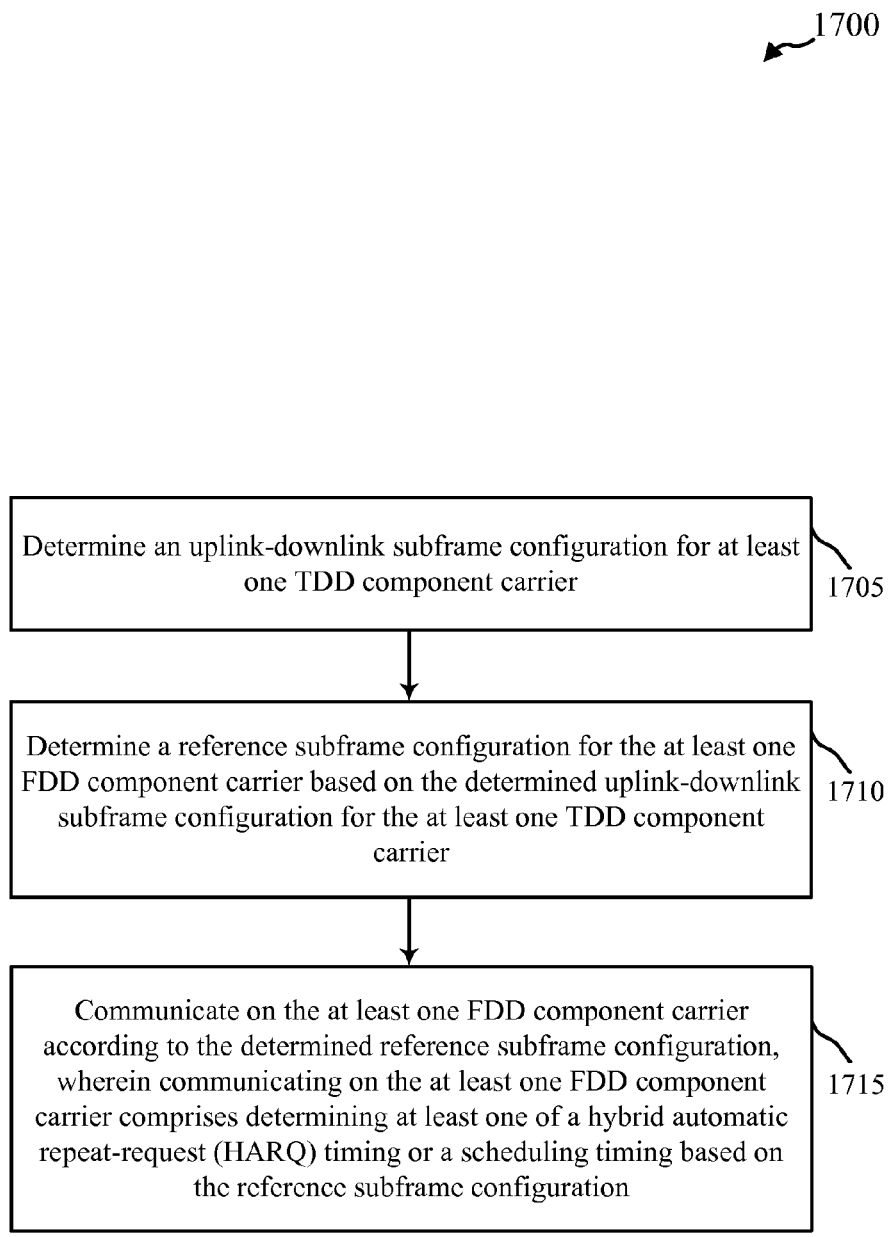
FIG. 17 shows a flowchart illustrating another example of a method of multi-carrier communication.

FIG. 17 shows a flowchart illustrating an example of a method 1700 for multi-carrier communication according to various embodiments. The method 1700 may be implemented by the base stations 105, 105-a, 105-b, 105-c, and/or the UEs 115, 115-a, 115-b, 115-c of FIGS. 1, 3, 7 and/or 8, and/or by the devices 505 and/or 505-*a* of FIGS. 5 and/or 6. Further, the method 1700 may be employed in conjunction with various other methods described herein, such as the method 1600 depicted in FIG. 16.

At block 1705, the method may involve determining a TDD UL/DL subframe configuration for at least one TDD component carrier. The operations at block 1705, in some embodiments, may be performed by the multi-carrier subframe configuration modules 515, 515-*a*, 515-*b* and/or 515-*c* of FIGS. 5, 6, 7 and/or 8. In particular, the operations at block 1705 may be performed by the TDD configuration determination module 610 of the multi-carrier subframe configuration module 515-*a* of FIG. 6.

At block 1710, the method may involve determining a reference subframe configuration the at least one FDD component carrier, based on the TDD UL/DL subframe configuration determined at block 1705.

At block 1715, the method may involve communicating on the at least one FDD component carrier according to the reference subframe configuration, determined at block 1710. The communicating on the at least one FDD component carrier may include determining at least one of a hybrid automatic repeat-request (HARQ) timing or a scheduling timing based on the reference subframe configuration. In certain examples, HARQ timing may refer to a timing between a physical downlink shared channel (PDSCH) transmission or a physical uplink shared channel (PUSCH) transmission and a corresponding ACK/NAK message. Scheduling timing may refer to a timing between a physical downlink control channel (PDCCH) or enhanced/evolved PDCCH (EPDCCH) and a PDSCH or PUSCH. The operations at block 1715, in various embodiments, may be performed by the receiver modules 510 and/or 510-*a* of FIGS. 5 and/or 6, the transmitter module 520 and/or 520-*a* of FIGS. 5 and/or 6, and/or the transceiver module 710 and/or 850 of FIGS. 7 and/or 8.

The detailed description set forth above in connection with the appended drawings describes exemplary embodiments and does not necessarily represent all possible embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software/firmware, or combinations thereof. If implemented in software/firmware, the functions may be stored on or transmitted over as one or more instructions or code on a computer-readable medium. Other examples and implementations are within the scope and spirit of the disclosure and appended claims. For example, due to the nature of software/firmware, functions described above can be implemented using software/firmware executed by, e.g., a processor, hardware, hardwiring, or combinations thereof. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of multi-carrier communication for a device utilizing at least one time division duplex (TDD) component carrier and at least one frequency division duplex (FDD) component carrier in a wireless communications network, the method comprising:
   determining a first reference subframe configuration for a downlink of the at least one FDD component carrier;
   determining a second reference subframe configuration for an uplink of the at least one FDD component carrier;
   identifying at least one downlink subframe in the at least one FDD component carrier that is not part of the first reference subframe configuration;
   receiving scheduling information during the at least one identified downlink subframe via one of self-carrier scheduling from the at least one FDD component carrier or cross-carrier scheduling from the at least one TDD component carrier; and
   communicating on the at least one FDD component carrier according to the determined first and second reference subframe configurations in respective downlink and uplink directions, wherein communicating on the at least one FDD component carrier comprises determining at least one of a hybrid automatic repeat-request (HARD) timing or a scheduling timing based on the first reference subframe configuration or the second reference subframe configuration.

2. The method of claim 1, further comprising:
   determining the at least one TDD component carrier as a primary component carrier and the at least one FDD component carrier as a secondary component carrier.

3. The method of claim 1, wherein determining the second reference subframe configuration for the uplink of the at least one FDD component carrier comprises:
   determining the second reference subframe configuration to be the same as the first reference subframe configuration.

4. The method of claim 3, wherein determining the first reference subframe configuration comprises:
   determining a subframe configuration of the at least one TDD component carrier; and
   determining the first reference subframe configuration to be the same as the subframe configuration determined for the at least one TDD component carrier.

5. The method of claim 1, wherein determining the second reference subframe configuration for the uplink of the at least one FDD component carrier comprises:
   determining a reference subframe configuration different from the determined first reference subframe configuration.

6. The method of claim 1, wherein at least one of the first and second reference subframe configurations is determined based on whether self-carrier scheduling or cross-carrier scheduling is used to schedule communications on the at least one FDD component carrier.

7. The method of claim 1, wherein the at least one FDD component carrier comprises at least two FDD component carriers, and wherein:
   determining the first reference subframe configuration for the downlink of the at least one FDD component carrier comprises determining the first reference subframe configuration for the downlink of the at least two FDD component carriers; and
   determining the second reference subframe configuration for the uplink of the at least one FDD component carrier comprises determining the second reference subframe configuration for the uplink of the at least two FDD component carriers.

8. The method of claim 4, wherein at least one of the determining of the first reference subframe configuration and the determining of the second reference subframe configuration is based at least in part on a subframe configuration determined for the at least one TDD component carrier.

9. The method of claim 1, wherein at least one of the determining of the first reference subframe configuration and the determining of the second reference subframe configuration is based at least in part on a duplex capability of the device.

10. The method of claim 9, wherein the device comprises a half-duplex device for multi-carrier communications.

11. The method of claim 1, further comprising:
    identifying at least one special subframe in the first reference subframe configuration; and
    treating the at least one identified special subframe as a regular downlink subframe.

12. The method of claim 1, further comprising:
    providing acknowledgement/negative acknowledgement (ACK/NAK) feedback for the at least one identified downlink subframe.

13. The method of claim 12, wherein the ACK/NAK feedback for the at least one identified downlink subframe is provided in a same uplink subframe with the ACK/NAK feedback for at least one downlink subframe part of the first reference subframe configuration.

14. The method of claim 1, wherein:
    determining the first reference subframe configuration is based at least part on one or more received signals.

15. The method of claim 1, wherein determining at least one of the first reference subframe configuration or the second reference subframe configuration is based at least in part on a subframe configuration of the at least one TDD component carrier.

16. An apparatus for multi-carrier communication for a device utilizing at least one time division duplex (TDD) component carrier and at least one frequency division duplex (FDD) component carrier in a wireless communications network, the apparatus comprising:
    means for determining a first reference subframe configuration for a downlink of the at least one FDD component carrier;
    means for determining a second reference subframe configuration for an uplink of the at least one FDD component carrier;
    means for identifying at least one downlink subframe in the at least one FDD component carrier that is not part of the first reference subframe configuration;
    means for receiving scheduling information during the at least one identified downlink subframe via one of self-carrier scheduling from the at least one FDD component carrier or cross-carrier scheduling from the at least one TDD component carrier; and
    means for communicating on the at least one FDD component carrier according to the determined first and second reference subframe configurations in respective downlink and uplink directions, wherein communicating on the at least one FDD component carrier comprises determining at least one of a hybrid automatic repeat-request (HARD) timing or a scheduling timing based on the first reference subframe configuration or the second reference subframe configuration.

17. The apparatus of claim 16, further comprising:
means for determining the at least one TDD component carrier as a primary component carrier and the at least one FDD component carrier as a secondary component carrier.

18. The apparatus of claim 16, wherein the means for determining the second reference subframe configuration for the uplink of the at least one FDD component carrier determines the second reference subframe configuration to be the same as the first reference subframe configuration.

19. The apparatus of claim 18, wherein the means for determining the first reference subframe configuration determines a subframe configuration of the at least one TDD component carrier, and determines the first reference subframe configuration to be the same as the subframe configuration determined for the at least one TDD component carrier.

20. The apparatus of claim 16, wherein the means for determining the second reference subframe configuration for the uplink of the at least one FDD component carrier determines a reference subframe configuration that is different from the first reference subframe configuration.

21. The apparatus of claim 16, wherein at least one of the first and second reference subframe configurations is determined based on whether self-carrier scheduling or cross-carrier scheduling is used to schedule communications on the at least one FDD component carrier.

22. An apparatus for multi-carrier communication for a device utilizing at least one time division duplex (TDD) component carrier and at least one frequency division duplex (FDD) component carrier in a wireless communications network, the apparatus comprising:
a processor; and
a memory coupled to the processor, wherein the processor is configured to:
determine a first reference subframe configuration for a downlink of the at least one FDD component carrier,
determine a second reference subframe configuration for an uplink of the at least one FDD component carrier;
identify at least one downlink subframe in the at least one FDD component carrier that is not part of the first reference subframe configuration;
receive scheduling information during the at least one identified downlink subframe via one of self-carrier scheduling from the at least one FDD component carrier or cross-carrier scheduling from the at least one TDD component carrier, and
communicate on the at least one FDD component carrier according to the determined first and second reference subframe configurations in respective downlink and uplink directions, wherein communicating on the at least one FDD component carrier comprises determining at least one of a hybrid automatic repeat-request (HARD) timing or a scheduling timing based on the first reference subframe configuration or the second reference subframe configuration.

23. The apparatus of claim 22, wherein the processor is further configured to:
determine the at least one TDD component carrier as a primary component carrier and the at least one FDD component carrier as a secondary component carrier.

24. The apparatus of claim 22, wherein the processor is further configured to:
determine the second reference subframe configuration to be the same as the first reference subframe configuration.

25. The apparatus of claim 22, wherein at least one of the first and second reference subframe configurations is determined based on whether self-carrier scheduling or cross-carrier scheduling is used to schedule communications on the at least one FDD component carrier.

26. A non-transitory computer-readable medium for storing instructions executable by a processor, comprising:
instructions to determine a first reference subframe configuration for a downlink of at least one FDD component carrier;
instructions to determine a second reference subframe configuration for an uplink of the at least one FDD component carrier;
instructions to identify at least one downlink subframe in the at least one FDD component carrier that is not part of the first reference subframe configuration;
instructions to receive scheduling information during the at least one identified downlink subframe via one of self-carrier scheduling from the at least one FDD component carrier or cross-carrier scheduling from the at least one TDD component carrier; and
instructions to communicate on the at least one FDD component carrier according to the determined first and second reference subframe configurations in respective downlink and uplink directions, wherein communicating on the at least one FDD component carrier comprises determining at least one of a hybrid automatic repeat-request (HARD) timing or a scheduling timing based on the first reference subframe configuration or the second reference subframe configuration.

27. The non-transitory computer-readable medium of claim 26, further comprising:
instructions to determine at least one TDD component carrier as a primary component carrier and the at least one FDD component carrier as a secondary component carrier.

28. The non-transitory computer-readable medium of claim 26, wherein the instructions to determine the second reference subframe configuration for the uplink of the at least one FDD component carrier comprise instructions to:
determine the second reference subframe configuration to be the same as the first reference subframe configuration.

29. The non-transitory computer-readable medium of claim 26, wherein at least one of the first and second reference subframe configurations is determined based on whether self-carrier scheduling or cross-carrier scheduling is used to schedule communications on the at least one FDD component carrier.

* * * * *

UNITED STATES PATENT AND TRADEMARK OFFICE
CERTIFICATE OF CORRECTION

PATENT NO. : 9,584,284 B2
APPLICATION NO. : 14/495619
DATED : February 28, 2017
INVENTOR(S) : Wanshi Chen, Peter Gaal and Jelena Damnjanovic It is certified that error appears in the above-identified patent and that said Letters Patent is hereby corrected as shown below:

In the Claims

Claim 1, Column 29, Line 27 should read:
1. A method of multi-carrier communication for a device utilizing at least one time division duplex (TDD) component carrier and at least one frequency division duplex (FDD) component carrier in a wireless communications network, the method comprising:
 determining a first reference subframe configuration for a downlink of the at least one FDD component carrier;
determining a second reference subframe configuration for an uplink of the at least one FDD component carrier;
 identifying at least one downlink subframe in the at least one FDD component carrier that is not part of the first reference subframe configuration;
 receiving scheduling information during the at least one identified downlink subframe via one of self-carrier scheduling from the at least one FDD component carrier or cross-carrier scheduling from the at least one TDD component carrier; and
 communicating on the at least one FDD component carrier according to the determined first and second reference subframe configurations in respective downlink and uplink directions, wherein communicating on the at least one FDD component carrier comprises determining at least one of a hybrid automatic repeat-request (HARQ) timing or a scheduling timing based on the first reference subframe configuration or the second reference subframe configuration.

Claim 16, Column 30, Line 65 should read:
16. An apparatus for multi-carrier communication for a device utilizing at least one time division duplex (TDD) component carrier and at least one frequency division duplex (FDD) component carrier in a wireless communications network, the apparatus comprising:
 means for determining a first reference subframe configuration for a downlink of the at least one FDD component carrier;
 means for determining a second reference subframe configuration for an uplink of the at least one FDD component carrier;

Signed and Sealed this
Sixth Day of June, 2017

Michelle K. Lee
*Director of the United States Patent and Trademark Office*

CERTIFICATE OF CORRECTION (continued)
U.S. Pat. No. 9,584,284 B2

Page 2 of 3 means for identifying at least one downlink subframe in the at least one FDD component carrier that is not part of the first reference subframe configuration;

means for receiving scheduling information during the at least one identified downlink subframe via one of self-carrier scheduling from the at least one FDD component carrier or cross-carrier scheduling from the at least one TDD component carrier; and means for communicating on the at least one FDD component carrier according to the determined first and second reference subframe configurations in respective downlink and uplink directions, wherein communicating on the at least one FDD component carrier comprises determining at least one of a hybrid automatic repeat-request (HARQ) timing or a scheduling timing based on the first reference subframe configuration or the second reference subframe configuration.

Claim 22, Column 31, Line 55 should read:
22. An apparatus for multi-carrier communication for a device utilizing at least one time division duplex (TDD) component carrier and at least one frequency division duplex (FDD) component carrier in a wireless communications network, the apparatus comprising:
    a processor; and
    a memory coupled to the processor, wherein the processor is configured to:
        determine a first reference subframe configuration for a downlink of the at least one FDD component carrier,
        determine a second reference subframe configuration for an uplink of the at least one FDD component carrier;
identify at least one downlink subframe in the at least one FDD component carrier that is not part of the first reference subframe configuration;
receive scheduling information during the at least one identified downlink subframe via one of self-carrier scheduling from the at least one FDD component carrier or cross-carrier scheduling from the at least one TDD component carrier, and
      communicate on the at least one FDD component carrier according to the determined first and second reference subframe configurations in respective downlink and uplink directions, wherein communicating on the at least one FDD component carrier comprises determining at least one of a hybrid automatic repeat-request (HARQ) timing or a scheduling timing based on the first reference subframe configuration or the second reference subframe configuration.

Claim 26, Column 32, Line 38 should read:
26. A non-transitory computer-readable medium for storing instructions executable by a processor, comprising:
      instructions to determine a first reference subframe configuration for a downlink of at least one FDD component carrier;
      instructions to determine a second reference subframe configuration for an uplink of the at least one FDD component carrier;
      instructions to identify at least one downlink subframe in the at least one FDD component carrier that is not part of the first reference subframe configuration;
      instructions to receive scheduling information during the at least one identified downlink subframe via one of self-carrier scheduling from the at least one FDD component carrier or cross-carrier scheduling from the at least one TDD component carrier; and
      instructions to communicate on the at least one FDD component carrier according to the determined first and second reference subframe configurations in respective downlink and uplink directions, wherein communicating on the at least one FDD component carrier comprises determining at least one of a hybrid automatic repeat-request (HARQ) timing or a scheduling timing based on the first reference subframe configuration or the second reference subframe configuration.